(12) United States Patent
Eguchi et al.

(10) Patent No.: US 8,462,440 B2
(45) Date of Patent: Jun. 11, 2013

(54) OPTICAL SYSTEM AND OPTICAL APPARATUS HAVING THE SAME

(75) Inventors: Kaoru Eguchi, Utsunomiya (JP); Norihito Hiasa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/436,244

(22) Filed: Mar. 30, 2012

(65) Prior Publication Data

US 2012/0250168 A1  Oct. 4, 2012

(30) Foreign Application Priority Data

Apr. 4, 2011  (JP) ................................ 2011-082795

(51) Int. Cl.
*G02B 15/14* (2006.01)

(52) U.S. Cl.
USPC ........... 359/676; 359/683; 359/684; 359/686; 359/688; 359/689; 359/691

(58) Field of Classification Search
USPC .................. 359/676, 683, 684, 686, 688, 689, 359/691
See application file for complete search history.

(56) References Cited

FOREIGN PATENT DOCUMENTS

| JP | 2002-131640 A | 5/2002 |
|---|---|---|
| JP | 2003-307672 A | 10/2003 |
| JP | 2004-020765 A | 1/2004 |
| JP | 2008-129403 A | 6/2008 |

*Primary Examiner* — Jack Dinh

(74) *Attorney, Agent, or Firm* — Canon U.S.A., Inc., IP Division

(57) ABSTRACT

An optical system includes at least one lens unit having a negative refractive power disposed closer to an object side than an aperture portion. The lens unit having a negative refractive power includes at least one positive lens and one negative lens. The ratio between the numbers of positive lenses and negative lenses included in the lens unit having a negative refractive power is appropriately set. The lens unit having a negative refractive power includes a plurality of negative lenses each having an appropriate Abbe number and relative partial dispersion and a positive lens having an appropriate Abbe number. A negative lens having the highest dispersion among the negative lenses is located in an appropriate position.

12 Claims, 13 Drawing Sheets

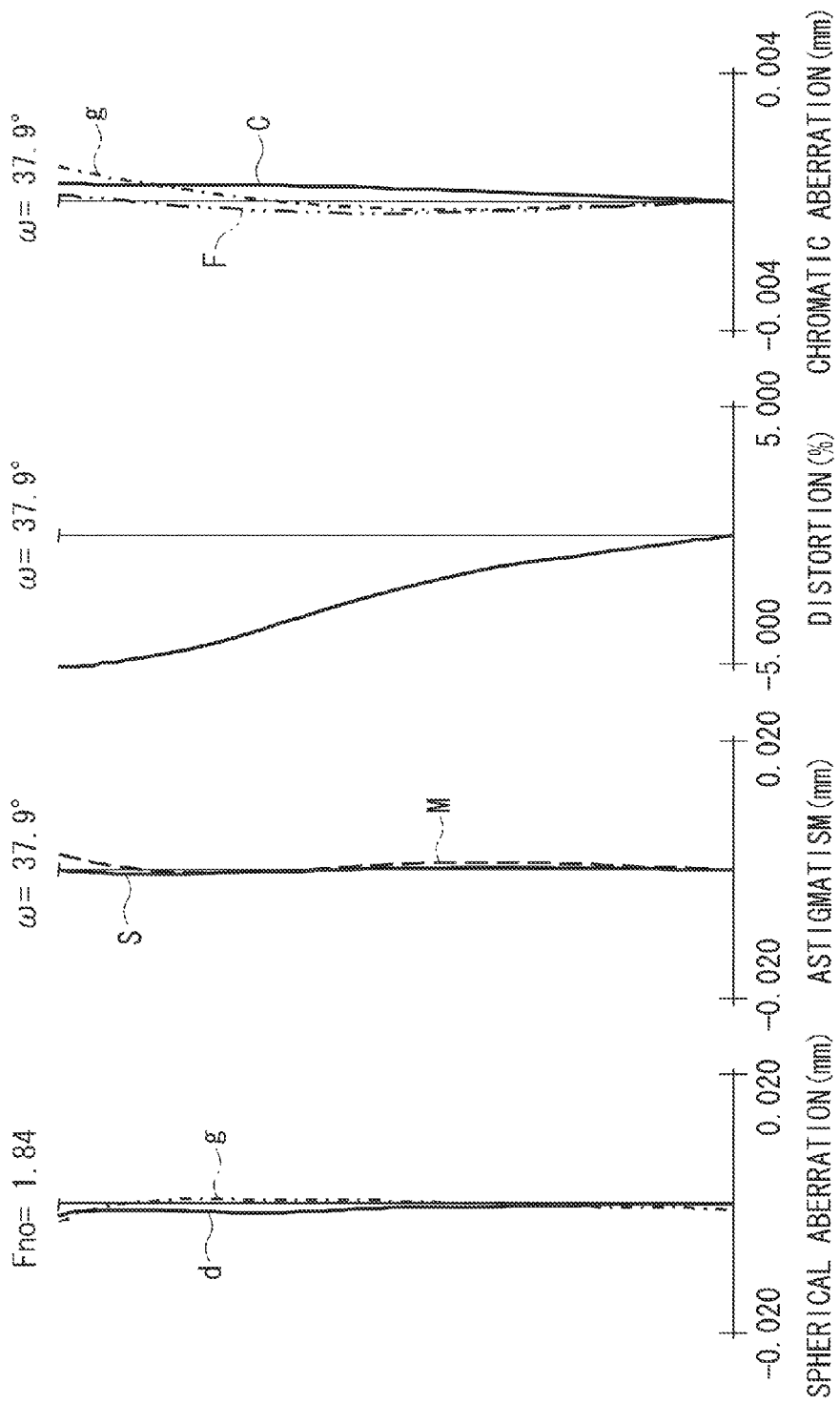

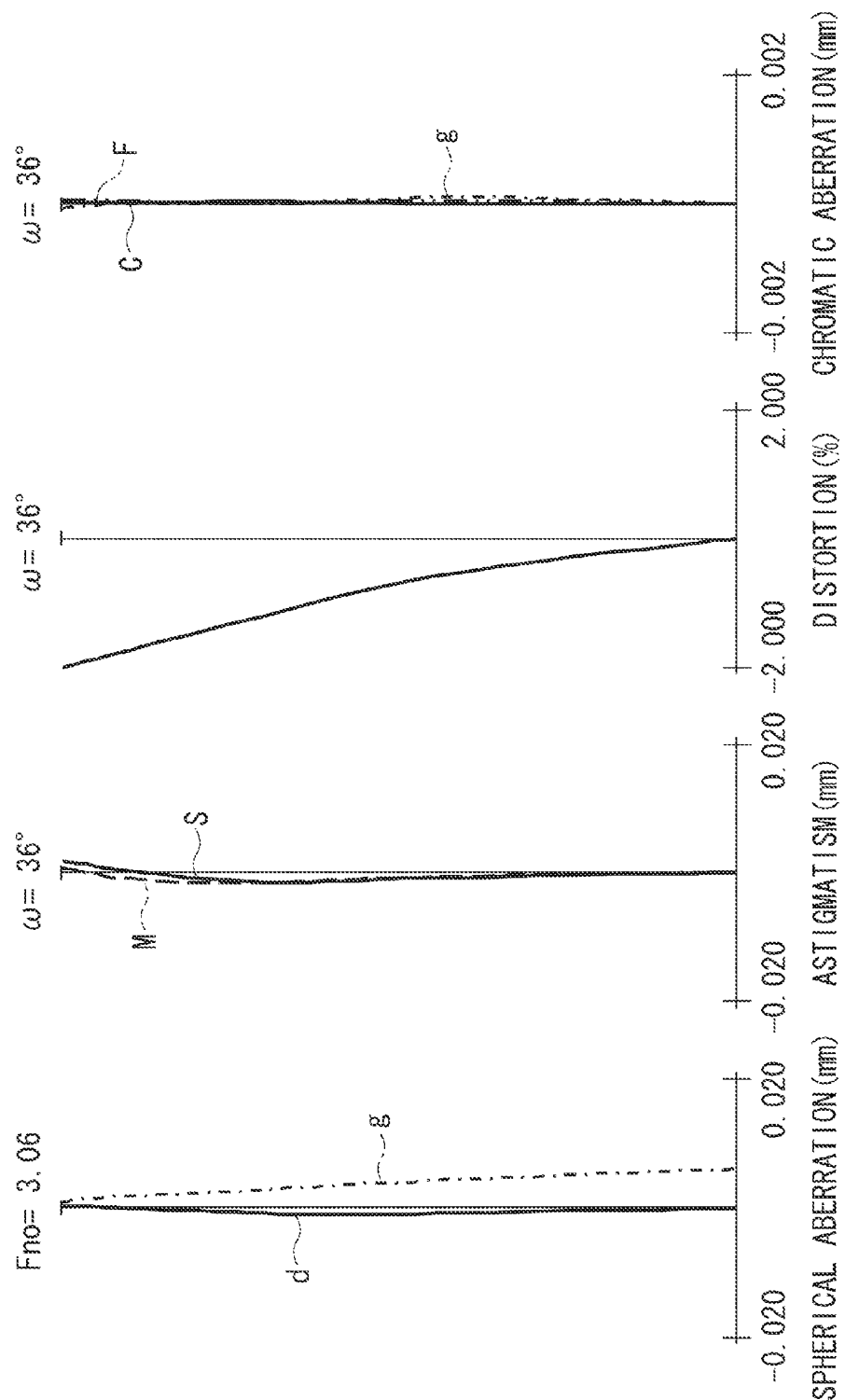

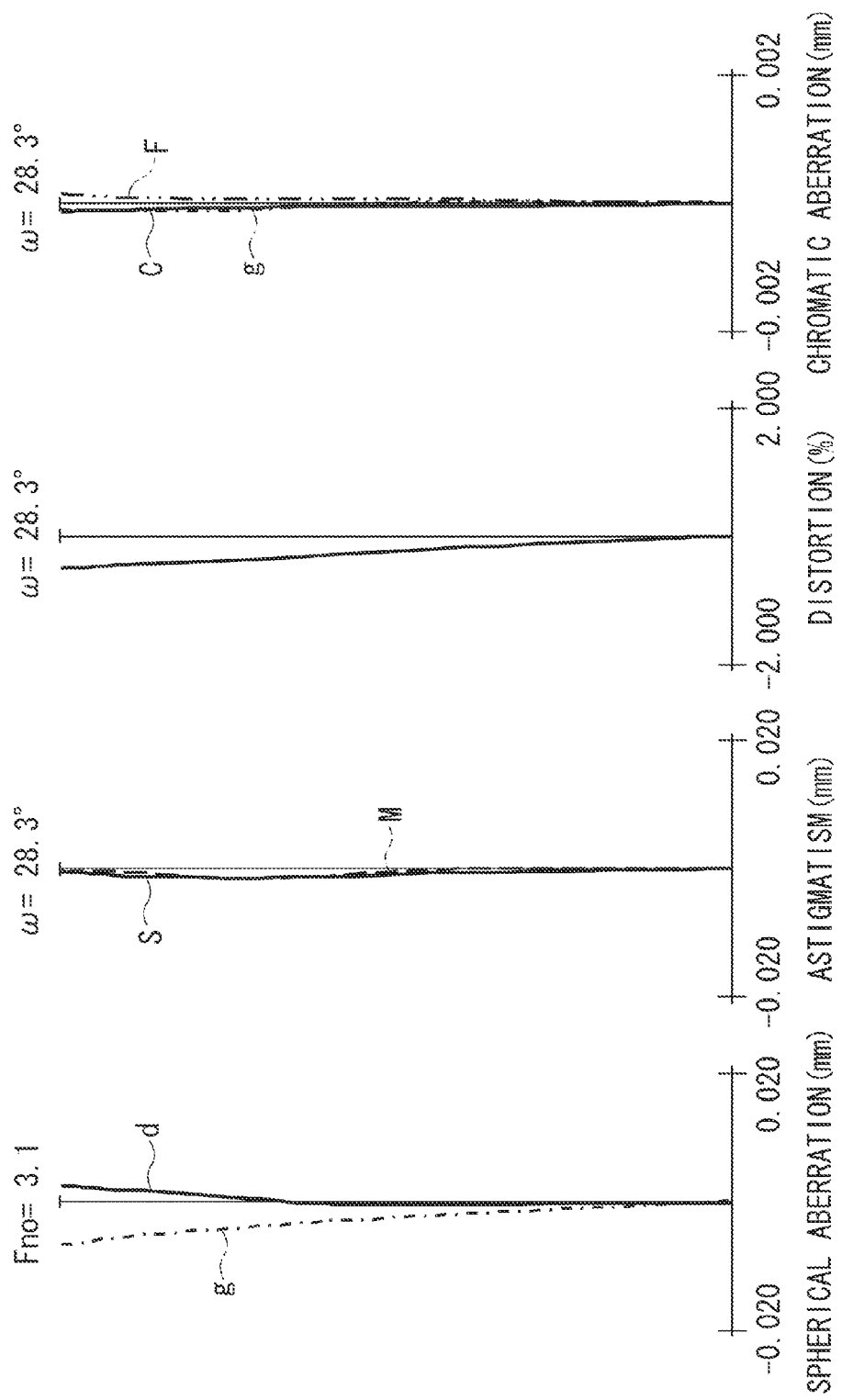

OPTICAL SYSTEM AND OPTICAL APPARATUS HAVING THE SAME

BACKGROUND OF THE INVENTION

1. Field of the Invention

The present invention relates to an optical system and an optical apparatus having the same, and more particularly, to an optical system capable of being applied to, for example, a still camera, a video camera, a projector, a TV camera for broadcasting, a monitoring camera, and the like, and an optical apparatus having the same.

2. Description of the Related Art

Recently, in a photographic optical system used for an image pickup apparatus such as a video camera and a projection optical system used for an image projection apparatus such as a projector, as the number of pixels increases (implementation of a large number of pixels), or as the density of pixels increases (implementation of a high density of pixels), a corresponding optical system having high quality of image and high performance is needed.

In order to cope with a large number of pixels and a high density of pixels, it is important to allow particularly chromatic aberration of magnification among various aberrations of the optical system to be corrected well.

Japanese Patent Application Laid-Open No. 2004-020765 discusses, as an optical system used for a projector, a negative lead type zoom lens including a total of five lens units where a lens unit having a negative refractive power is disposed at the closest object side. The zoom lens includes, in order from an object side to an image side, a first lens unit having a negative refractive power, second to fourth lens units having a positive refractive power which are moved for variation of magnification and for correcting the variation of an image plane caused by the variation of magnification, and a fifth lens unit having a positive refractive power, which is stationary during the variation of magnification. In the zoom lens, in order to allow chromatic aberration of magnification to be corrected well over the entire zoom range, a glass material having a relatively high relative partial dispersion is used for a negative lens of the first lens unit.

Japanese Patent Application Laid-Open No. 2002-131640 discusses, as an optical system used for an image pickup apparatus, a positive lead type zoom lens coping with a large number of pixels and a high density of pixels, which includes, in order from an object side to an image side, a first lens unit having a positive refractive power, a second lens unit having a negative refractive power, and a third lens unit having a positive refractive power. In the zoom lens, in order to allow chromatic aberration of magnification to be corrected over the entire range, a glass material having a relatively high relative partial dispersion is used for a negative lens of the second lens unit.

In addition, Japanese Patent Application Laid-Open Nos. 2008-129403 and 2003-307672 discuss retro-focus type monofocal lenses, where in order to allow chromatic aberration of magnification to be corrected well over the entire object distance range, a glass material of which the relative partial dispersion $\theta gF$ is relatively high in comparison with the Abbe number is used for a negative lens which is closer to the object side than an aperture stop.

As the number of pixels further increases and the density of pixels highly increases, in an optical system used for super high vision requiring, for example, 8000×4000 pixels as the number of pixels, a very small amount of aberration is required for various aberrations.

Particularly, with respect to chromatic aberration of magnification, an amount of chromatic aberration of magnification between g-line and F-line as well as an amount of chromatic aberration of magnification between C-line and F-line with respect to d-line as a reference is required to be very small. In order to reduce the amount of chromatic aberration of magnification between g-line and F-line, there is a need to consider an anomalous dispersion property (relation between Abbe number and relative partial dispersion ($\theta gF$ value)) of the glass material used.

In the aforementioned optical system, in order to correct chromatic aberration of magnification, a lens unit having a negative refractive power is disposed closer to the object side than an aperture portion SP determining a maximum axial light flux diameter, and chromatic aberration of magnification in the lens unit is corrected. Herein, the "aperture portion determining the maximum axial light flux diameter" denotes an aperture portion determining an F-number in an axial light flux (light flux of which the principal ray propagates along an optical axis) when an object distance is at infinite distance.

In general, in many cases, an aperture stop functions as the aperture portion SP. However, in the case of a zoom lens having no mechanical aperture stop, the maximum axial light flux diameter may be determined by a portion of a lens barrel or an outer diameter of a specific lens. In this case, the portion of the lens barrel or the outer diameter of the lens functions as the aperture portion SP determining the maximum axial light flux diameter.

However, the aforementioned documents do not discuss relative partial dispersion ($\theta gF$) of a glass material used. Therefore, if a material corresponding to the refractive index and the Abbe number is applied to a general glass material, the following results can be deducted.

In Japanese Patent Application Laid-Open No. 2004-020765, a material of the negative lens of the first lens unit having a negative refractive power is configured by using a glass material having low dispersion and a material having high dispersion, so that chromatic aberration of magnification between g-line and F-line with the high dispersion property can be reduced while correcting chromatic aberration of magnification between C-line and F-line. Although the relative partial dispersion of the glass material used is not discussed, in terms of the refractive index and the Abbe number, a glass material corresponding to S-FPL51 (product name) manufactured by OHARA, INC. may be used for the first negative lens of the first lens unit in Example 3, and a glass material corresponding to S-NPH1 (product name) manufactured by OHARA, INC. may be used for the second negative lens.

These materials have a large anomalous dispersion property in comparison with other glass materials. According to this configuration, chromatic aberration of magnification is not necessarily sufficiently corrected.

In Japanese Patent Application Laid-Open No. 2002-131640, a material of the negative lens of the second lens unit having a negative refractive power is configured by using a glass material having low dispersion and a material having high dispersion, so that chromatic aberration of magnification between g-line and F-line with the high dispersion property can be reduced while correcting chromatic aberration of magnification between C-line and F-line. Although the relative partial dispersion of the glass material used is not discussed, in terms of the refractive index and the Abbe number, a glass material corresponding to E-FDS1 (product name) manufactured by HOYA CO., LTD. may be used for the first negative lens of the second lens unit in Example 1, and a glass material corresponding to S-FSL5 (product name) manufactured by OHARA, INC. may be used for the second negative lens thereof.

Although E-FDS1 (product name) is a glass material having a large anomalous dispersion property in comparison with other glass materials, S-FSL5 (product name) is a glass material having a low anomalous dispersion property. Therefore, the issue of the correction of chromatic aberration of magnification is not necessarily sufficiently solved.

In Japanese Patent Application Laid-Open No. 2008-129403, a material of the negative lens of the first lens unit having a negative refractive power is configured by mainly using a glass material having low dispersion and a large relative partial dispersion difference ΔθgF in the positive direction. Therefore, chromatic aberration of magnification between g-line and F-line can be reduced while correcting chromatic aberration of magnification between C-line and F-line. Although the relative partial dispersion of the glass material used is not discussed, in terms of the refractive index and the Abbe number, a glass material corresponding to S-FPL53 (product name) manufactured by OHARA, INC. may be used for the first to fourth negative lenses of the first lens unit in Example 5, and a glass material corresponding to S-NPH2 manufactured by OHARA, INC. may be used for the fifth negative lens thereof.

These glass materials have high relative partial dispersion in comparison with other glass materials and an anomalous dispersion property. The negative lens formed by using a material having high dispersion is disposed adjacent the aperture portion SP, so that chromatic aberration of magnification between g-line and F-line remains. Therefore, chromatic aberration of magnification is not necessarily sufficiently corrected.

In Japanese Patent Application Laid-Open No. 2003-307672, a material having a low dispersion and a material having a high dispersion are used for a negative lens which is closer to the object side than an aperture stop. However, chromatic aberration of magnification is not necessarily sufficiently corrected.

SUMMARY OF THE INVENTION

According to an aspect of the present invention, an optical system includes a lens unit GLN including at least one lens unit having a negative refractive power which is disposed closer to an object side than an aperture portion SP, wherein, when a relative partial dispersion difference and an Abbe number of a material of a negative lens included in the lens unit GLN are denoted by $\Delta\theta LN$ and $\nu LN$, respectively, a negative lens satisfying the following conditions:

$$0.006 < \Delta\theta LN$$

$$60 < \nu LN$$

is denoted by a negative lens LNlow, the number of the negative lenses LNlow is denoted by SUM(LNlow), a negative lens satisfying the following conditions:

$$0.006 < \Delta\theta LN$$

$$\nu LN < 25$$

is denoted by a negative lens LNhigh, the number of the negative lenses LNhigh is denoted by SUM(LNhigh), the number of lenses included in the lens unit GLN is denoted by SUM(L), the number of negative lenses included in the lens unit GLN is denoted by SUM(LN), a sum of relative partial dispersion differences of materials of the negative lenses included in the lens unit GLN is denoted by SUM(ΔθLN), a negative lens having a minimum Abbe number among the negative lenses included in the lens unit GLN is denoted by a negative lens LNmin, an Abbe number thereof is denoted by νLNmin, a negative lens having a maximum Abbe number among the negative lenses included in the lens unit GLN is denoted by a negative lens LNmax, an Abbe number thereof is denoted by νLNmax, a distance between an object-side surface vertex of the negative lens LNhigh and the aperture portion SP is denoted by dNS, and a distance between the most-object-side lens surface vertex and the aperture portion SP is denoted by d1S, the following conditions are satisfied:

$$0.60 < \text{SUM}(LN)/\text{SUM}(L) < 1.00$$

$$0.70 < (\text{SUM}(LN\text{low}) + \text{SUM}(LN\text{high}))/\text{SUM}(LN)$$

$$3.50 < \nu LN\text{max}/\nu LN\text{min} < 6.50$$

$$0.30 < dNS/d1S \leq 1.00$$

$$0.065 < \text{SUM}(\Delta\theta LN) < 0.250, \text{ and}$$

wherein, when the optical system is a zoom lens, the position of the aperture portion SP is a position defined when the zoom lens is at a wide-angle end.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A is an aberration chart of the optical system at the wide-angle end according to the second exemplary embodiment.

FIG. 6A is an aberration chart of the optical system at the wide-angle end according to the third exemplary embodiment.

FIG. 6B is an aberration chart of the optical system at a telephoto end according to the third exemplary embodiment.

DESCRIPTION OF THE EMBODIMENTS

Figure 1:
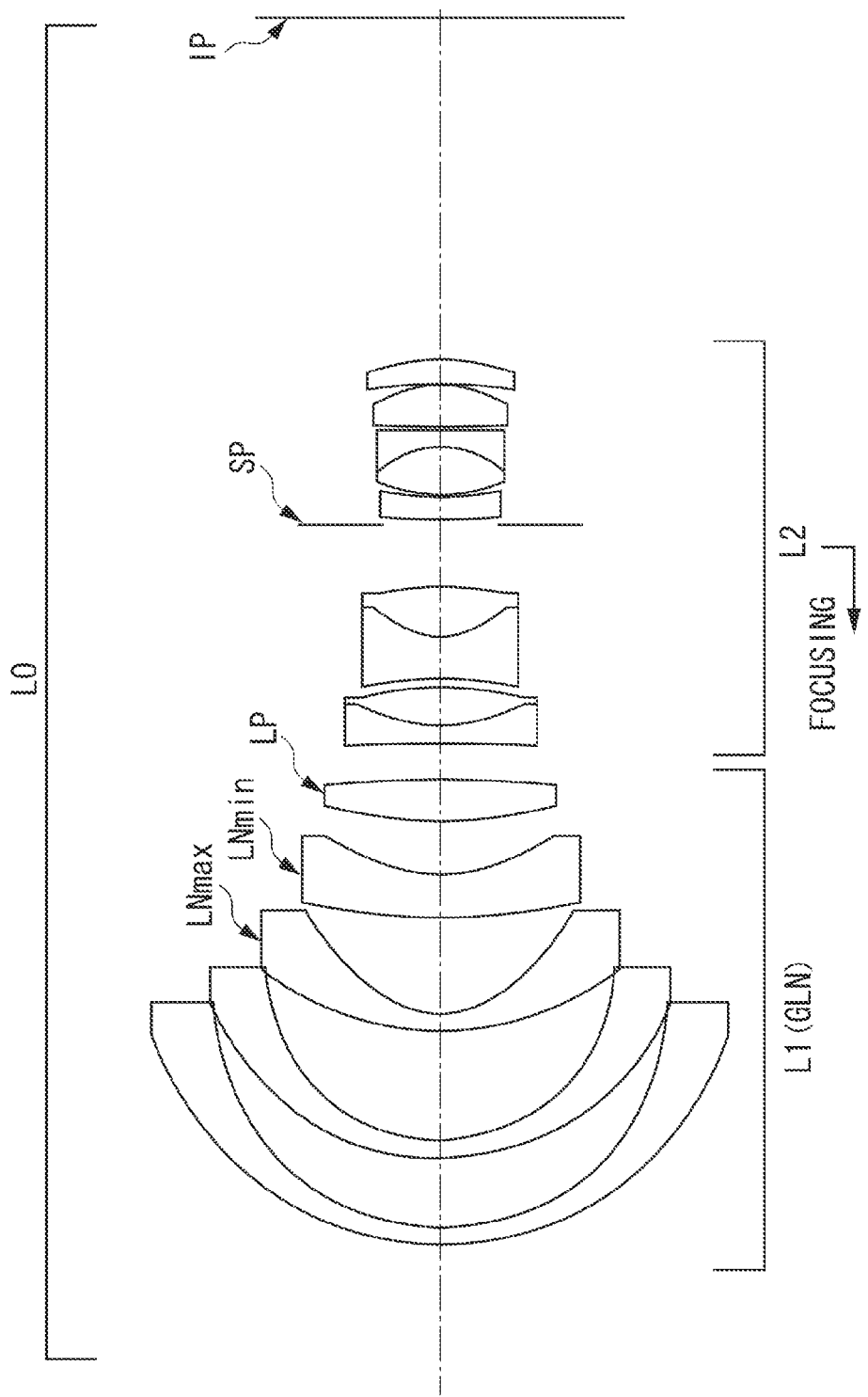
FIG. 1 is a lens cross-sectional view of an optical system according to a first exemplary embodiment of the present invention.

Various exemplary embodiments, features, and aspects of the invention will be described in detail below with reference to the drawings.

An optical system according to an exemplary embodiment of the present invention is a single focal length lens, a zoom lens, or the like having at least one lens unit GLN having a negative refractive power which is disposed closer to an object side than an aperture portion SP (at a zoom position at a wide-angle end when the optical system is a zoom lens) determining a maximum axial light flux diameter.

Chromatic aberration of magnification is corrected well by appropriately setting the number of all the lenses included in the lens unit GNL, the number of negative lenses, a material (an Abbe number, a relative partial dispersion difference, and a refractive index difference) of the negative lens, and the like.

In each lens cross-sectional view, reference numeral "L0" represents an optical system. Reference numeral "SP" represents an aperture stop. Reference numerals "L1", "L2", "L3", "L4", and "L5" represent a first lens unit, a second lens unit, a third lens unit, a fourth lens unit, and a fifth lens unit, respectively. Reference numeral "G" represents a prism.

Reference numeral "SP" represents an aperture portion (aperture stop) determining the maximum axial light flux diameter and corresponds to an aperture stop determining an F-number. Reference numeral "GNL" represents a lens unit having a negative refractive power which is disposed closer to an object side than the aperture stop SP.

Reference numeral "IP" represents an image plane. The image plane corresponds to an imaging surface of a solid-state image sensor (photoelectric conversion element) such as a CCD sensor or a CMOS sensor which receives light when the zoom lens is adapted to a video camera or a digital camera. If the zoom lens is adapted to a silver-halide film camera, the image plane corresponds to a film surface. In addition, if the zoom lens is adapted to an image projection apparatus such as a projector, the image plane corresponds to an image display device such as a liquid crystal panel.

In each aberration chart, reference numerals "d", "g", "C", and "F" represent d-line, g-line, C-line, and F-line, respectively. Reference numerals "M" and "S" represent a meridional image surface and a sagittal image surface, respectively. Reference numeral "Fno" represents an F-number, and "ω" represents a half angle of view.

Figure 2:
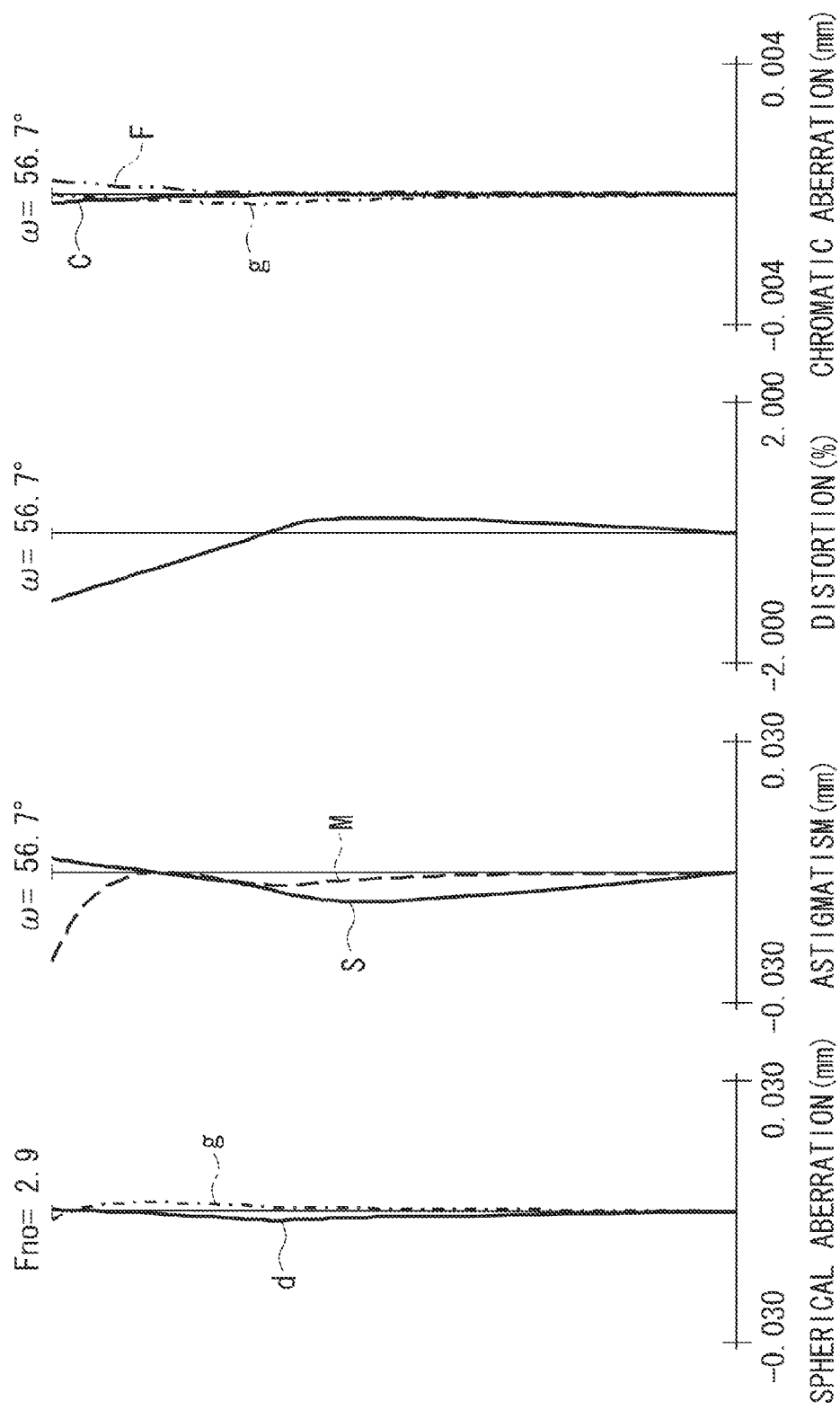
FIG. 2 is an aberration chart of the optical system according to the first exemplary embodiment.
Figure 8:
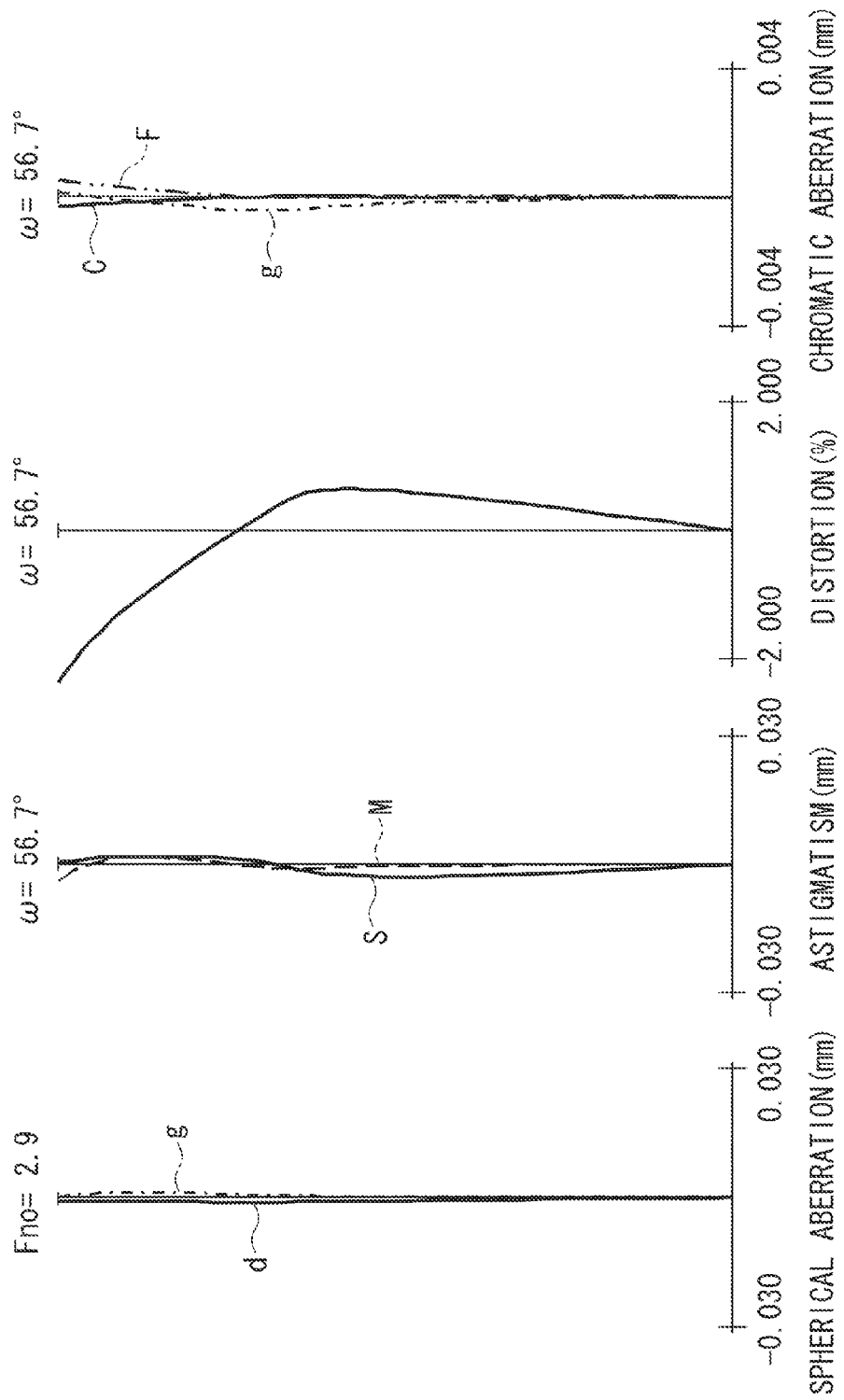
FIG. 8 is an aberration chart of an optical system according to the fourth exemplary embodiment.

The aberration charts of the first exemplary embodiment of FIG. 2 and the fourth exemplary embodiment of FIG. 8 are plotted with a scale where spherical aberration is 0.03 mm, astigmatism is 0.03 mm, distortion is 2%, and chromatic aberration of magnification is 0.004 mm.

Figure 4B:
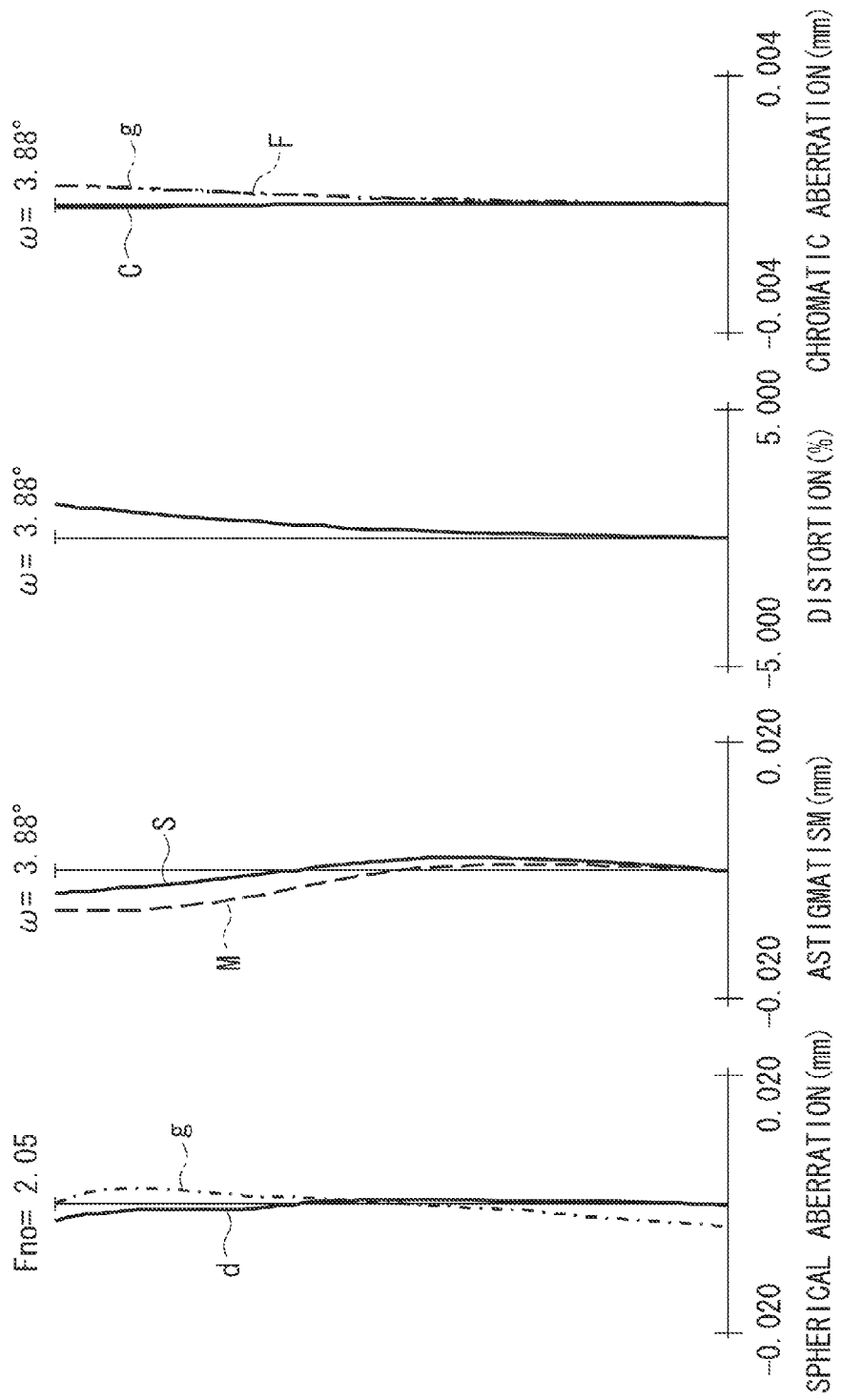
FIG. 4B is an aberration chart of the optical system at a telephoto end according to the second exemplary embodiment.

In addition, the aberration charts of the second exemplary embodiment of FIGS. 4A and 4B are plotted with a scale where spherical aberration is 0.02 mm, astigmatism is 0.02 mm, distortion is 5%, and chromatic aberration of magnification is 0.004 mm.

In addition, the aberration charts of the third exemplary embodiment of FIGS. 6A and 6B are plotted with a scale where spherical aberration is 0.02 mm, astigmatism is 0.02 mm, distortion is 2%, and chromatic aberration of magnification is 0.002 mm.

Hereinafter, in an optical system according to each exemplary embodiment, when the optical system is a zoom lens, a wide-angle end and a telephoto end denote zoom positions when a moving lens unit is mechanically positioned at two ends of a movable range along an optical axis.

In the related art, there are many known types of optical systems used for photographing or image projection. In most optical systems, at least one lens unit having a negative refractive power is disposed closer an object side than the aperture portion SP determining the maximum axial light flux diameter. In the optical systems having such a lens configuration, in order to obtain a high quality of image, it is important to allow chromatic aberration of magnification to be corrected well.

In the related art, in the correction of chromatic aberration of magnification, although chromatic aberration of magnification between C-line and F-line is corrected with d-line as a reference, chromatic aberration of magnification between g-line and F-line remains at a position having a high image height (position having a large angle of view). For this reason, for example, when a super-high-vision quality of image is considered, it is difficult to maintain the resolution over the entire image plane up to a high spatial frequency.

As a main reason why chromatic aberration of magnification between g-line and F-line remains, the following mechanism is considered.

Figure 9:
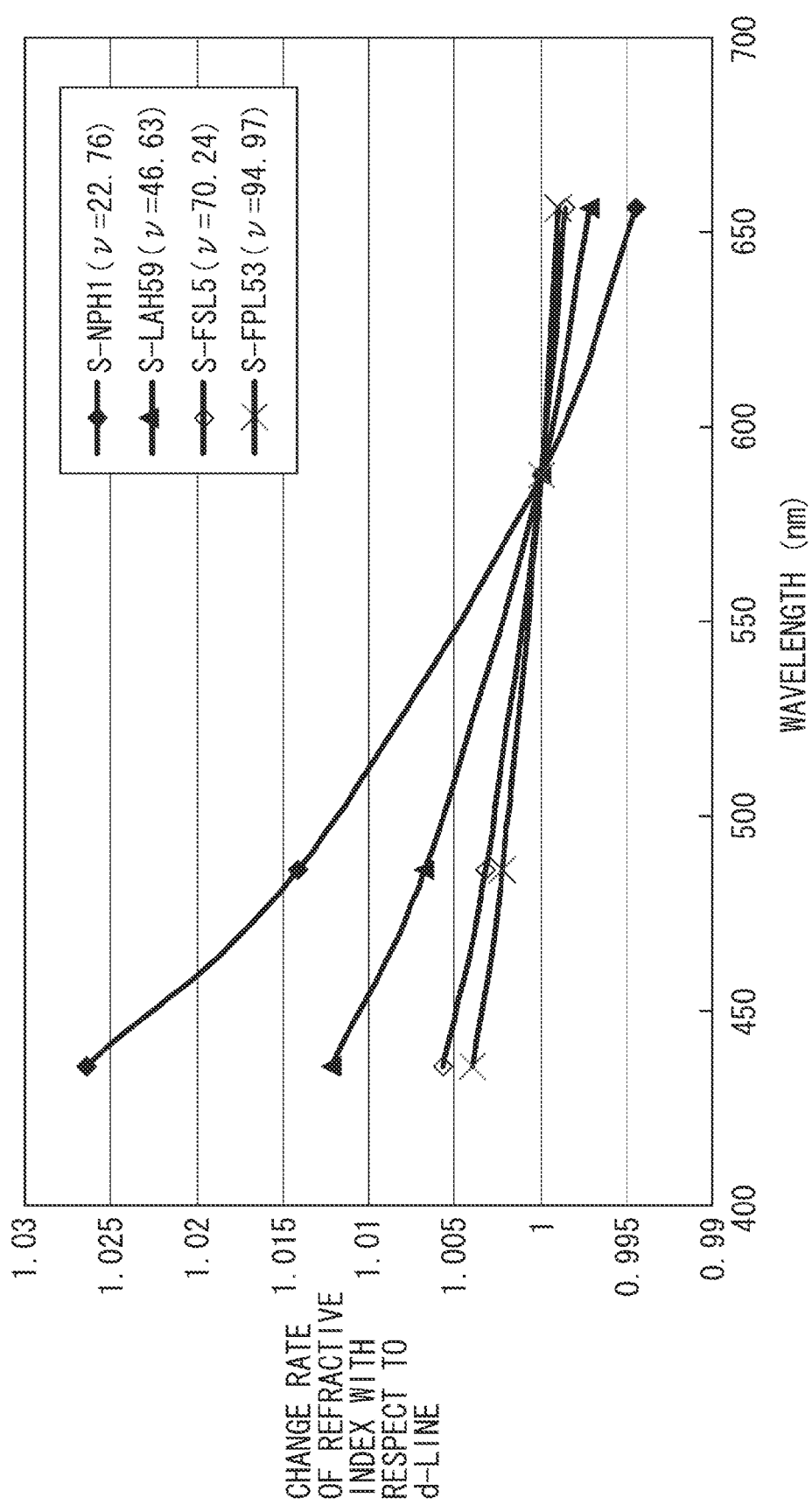
FIG. 9 is a diagram illustrating a change in refractive index of a general glass material with d-line taken as a reference according to each wavelength.

In general, with respect to optical materials used for a lens, when a change in refractive index at wavelengths is observed with d-line as a reference, the change in refractive index at a shorter wavelength side is larger than the change in refractive index at a longer wavelength than d-line. In the example of FIG. 9, the illustrated glass materials S-NPH1, S-LAH59, S-FSL5, and S-FPL53 are manufactured by and commercially available from OHARA INC.

The ratio of the change in refractive index becomes dominantly increased if the material is a material having high dispersion (material having small Abbe number v). According to this optical characteristic, although chromatic aberration of magnification between C-line and F-line is simply corrected with d-line as a reference, chromatic aberration of magnification between g-line and F-line remains. Particularly, as the image height becomes a high position, a gap of chromatic aberration of magnification between g-line and F-line is increased. For this reason, at the zoom position of the wide-angle end of the zoom lens or in a retro-focus type optical system in the related art, chromatic aberration of magnification of g-line is bent toward a positive direction from a near position of the optical axis to the highest image height.

In order to reduce the amount of chromatic aberration of magnification between g-line and F-line (the bending amount of chromatic aberration of magnification at a short wavelength), anomalous dispersion properties (anomalous relative partial dispersion) of the glass materials (relation between the Abbe number and the relative partial dispersion (θgF value) between materials) may be considered.

Herein, the Abbe number v of the material is as follows. The refractive indexes of the material with respect to F-line (486.1 nm), d-line (587.6 nm), and C-line (656.3 nm) are denoted by NF, Nd, and NC, respectively. In this case, the Abbe number v is expressed by the following equation:

$$v = (Nd-1)/(NF-NC)$$

Figure 10:
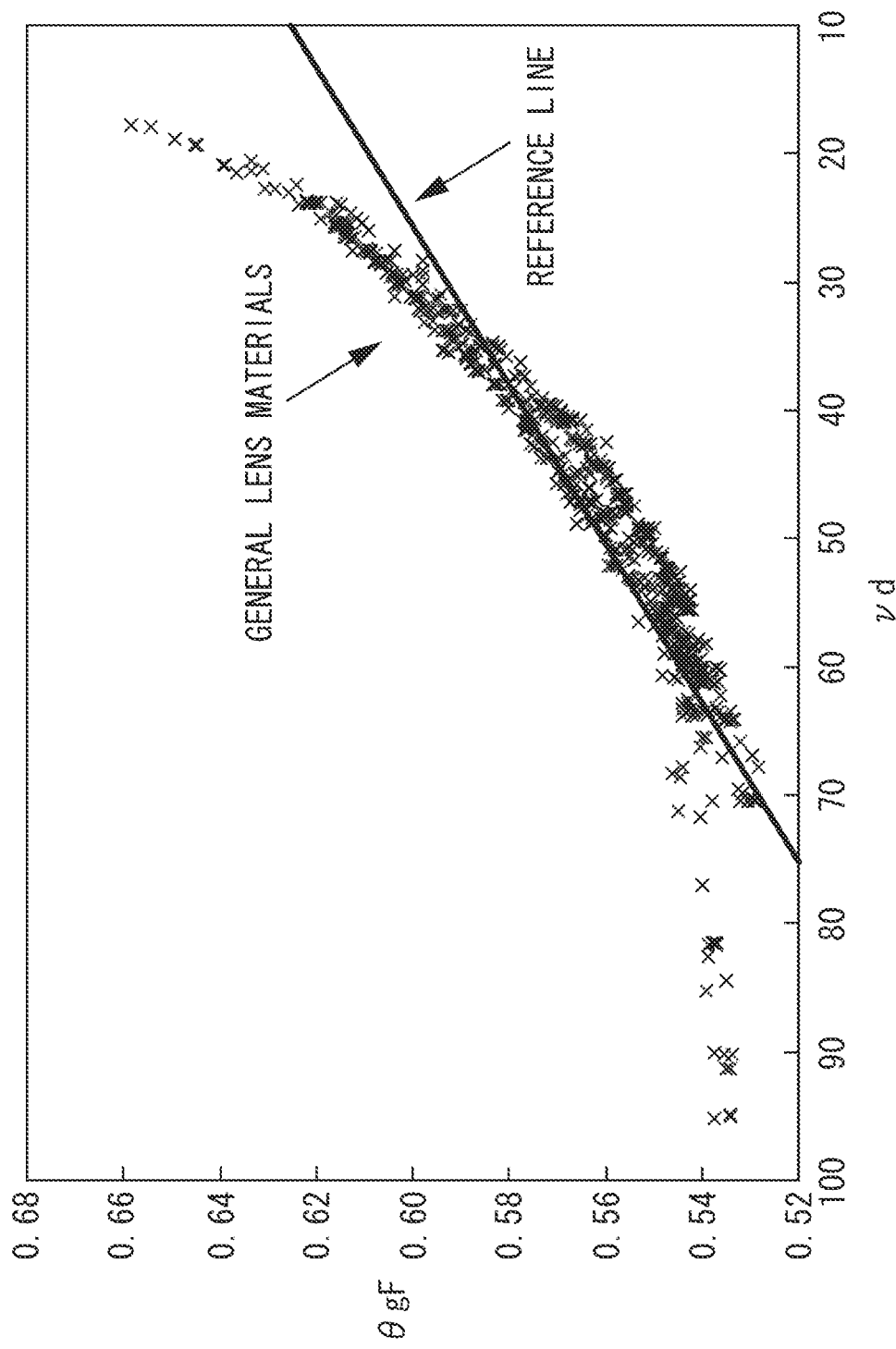
FIG. 10 is a diagram illustrating a glass map and a standard line in a graph plotted with a horizontal axis of vd and a vertical axis of θgF.

In addition, an anomalous dispersion property refers to a difference between a value of relative partial dispersion θgF of a material and a θgF value of a "standard line" plotted on a glass map illustrated in FIG. 10. The anomalous dispersion property is denoted by ΔθgF (referred to as a relative partial dispersion difference). If the absolute value of a relative partial dispersion difference ΔθgF is large, it is represented, "the anomalous dispersion property of the material is large". The "standard line" is a straight line defined by the following Equation (a), and the relative partial dispersion difference ΔθgF is a value defined by the following Equation (b):

$$\theta gF = -1.61783 \times 10^{-3} \times v + 0.64146 \quad (a)$$

$$\Delta\theta gF = \theta gF - (-1.61783 \times 10^{-3} \times v + 0.64146) \quad (b)$$

For example, in an optical system where chromatic aberration of magnification of g-line is bent toward a positive direction as the image height is increased, the following method may be used to reduce the gap of chromatic aberration of magnification between g-line and F-line.

In the optical system, a material having a large relative partial dispersion difference ΔθgF in the positive direction can be used for a negative lens included in a lens unit having a negative refractive power which is disposed closer to the object side than the aperture portion SP determining the maximum axial light flux diameter (at the zoom position at the wide-angle end in the case of a zoom lens). According to this configuration, in comparison with a general glass material disposed adjacent the standard line, g-line can be greatly refracted in the central (optical axis) direction of the image plane, so that chromatic aberration of magnification of the short wavelength side occurring due to other lenses can be corrected.

Hereinbefore, the mechanism for reducing the gap of chromatic aberration of magnification between g-line and F-line by using a material having a large relative partial dispersion difference ΔθgF in the positive direction for the negative lens has been described.

However, even in the same value of the relative partial dispersion differences ΔθgF, there are a material having high dispersion and a material having low dispersion in terms of the Abbe number. Therefore, the difference between the case using the material having high dispersion and the case using the material having low dispersion is considered.

For example, the case where only the material having a large relative partial dispersion difference ΔθgF in the positive direction and having high dispersion is used for the negative lens is considered. If only the material having high dispersion is used for the negative lens, due to the high dispersion property, the gap of chromatic aberration of magnification between g-line and F-line can be reduced by using a relatively weak optical power. However, the correction of chromatic aberration of magnification between C-line and F-line is adversely affected, so that the correction cannot be performed. In addition, as described above, since the correction is finished with a relatively weak optical power to correct chromatic aberration of magnification between g-line and F-line, a large number of lenses are required to satisfy the optical power defined by the lens specification.

Therefore, a glass material having high dispersion and a large relative partial dispersion difference ΔθgF in the positive direction is used for some of the negative lenses in the lens unit having a negative refractive power which is closer to the object side than the aperture portion SP. In addition, a glass material having low dispersion and a large relative partial dispersion difference ΔθgF in the positive direction can be used for some lenses (or all the remaining lenses).

According to this configuration, since the negative lens made of a material having high dispersion as well as the negative lens made of a material having low dispersion has large relative partial dispersion differences ΔθgF in the positive direction, the gap of chromatic aberration of magnification between g-line and F-line can be reduced. In addition, it is possible to correct chromatic aberration of magnification between C-line and F-line by using the negative lens made of a material having low dispersion.

However, in various types of optical systems, in order to correct chromatic aberration of magnification at a position having a high image height, a material having a larger relative partial dispersion difference ΔθgF in the positive direction is used for the negative lens where an off-axis principal light beam passes through a marginal portion of the lens. For example, in a lens adjacent the aperture portion SP, an off-axis principal light beam also passes through the central portion of the lens. For this reason, although the negative lens configured by using a material having a large relative partial dispersion difference ΔθgF in the positive direction is disposed, it is difficult to allow chromatic aberration of magnification to be corrected well. Even though the correction can be performed, the balance with respect to axial chromatic aberration is lost, so that the resolvable spatial frequency is lowered. Therefore, it is difficult to obtain a high resolution optical system over the entire image plane.

Therefore, at a position separated by some distance from the aperture portion SP, the negative lens having a large relative partial dispersion difference ΔθgF in the positive direction is disposed at a position so that the off-axis principal light beam passes through the marginal portion of the lens.

In addition, in comparison with the negative lens made of a material having low dispersion, the negative lens made of a material having high dispersion can effectively correct the gap of chromatic aberration of magnification between g-line and F-line. For this reason, in order to effectively chromatic aberration of magnification between g-line and F-line, particularly the negative lens made of a material having high dispersion is be disposed at a position away from the aperture portion SP.

Although an accurate value of the magnitude of the anomalous dispersion property required to correct chromatic aberration of magnification is different according to the type of the lens, a very large anomalous dispersion property is required so as to achieve the purpose. For this reason, although 20% to 30% of the negative lenses included in the lens unit having a negative refractive power which is disposed closer to the object side than the aperture portion SP are replaced with the aforementioned negative lenses having a large relative partial dispersion difference ΔθgF in the positive direction, the purpose cannot be achieved.

In an optical system according to an exemplary embodiment, in order to achieve the purpose by using the material in the current state, it can be understood that it is useful that 70% or more of the negative lenses included in the lens unit having a negative refractive power which is disposed closer to the object side than the aperture portion SP be replaced with the negative lenses having a large relative partial dispersion difference ΔθgF in the positive direction. According to this configuration, the anomalous dispersion property of the entire lens unit having a negative refractive power is increased, so that chromatic aberration of magnification occurring due to other lens units can be corrected.

Therefore, in an optical system according to an exemplary embodiment, by appropriately setting the number and positions of negative lenses of the lens unit having a negative refractive power, which is disposed closer the object side than the aperture portion SP, and dispersion properties thereof, it is possible to allow chromatic aberration of magnification to be corrected well while maintaining the balance with respect to other aberrations.

Next, configurations of the optical systems according to the exemplary embodiments will be described.

The optical system L0 according to each of the exemplary embodiments includes at least one lens unit GLN having a negative refractive power closer to an object side than an aperture portion SP (at a zoom position of the wide-angle end when the optical system is a zoom lens) which determines a maximum axial light flux diameter.

A relative partial dispersion difference and an Abbe number of a material of a negative lens included in the lens unit GLN are denoted by $\Delta\theta LN$ and $\nu LN$, respectively. In the case, a negative lens satisfying the following conditions is denoted by a negative lens LNlow:

$$0.006 < \Delta\theta LN$$

$$60 < \nu LN$$

The number of the negative lenses LNlow is denoted by SUM(LNlow). A negative lens satisfying the following conditions is denoted by a negative lens LNhigh.

$$0.006 < \Delta\theta LN$$

$$\nu LN < 25$$

The number of the negative lenses LNhigh is denoted by SUM(LNhigh).

The number of lenses included in the lens unit GLN is denoted by SUM(L).

The number of negative lenses included in the lens unit GLN is denoted by SUM(LN).

A sum of relative partial dispersion differences of materials of the negative lenses included in the lens unit GLN is denoted by SUM($\Delta\theta LN$).

A negative lens having a minimum Abbe number among the negative lenses included in the lens unit GLN is denoted by a negative lens LNmin, and an Abbe number thereof is denoted by $\nu$Nmin.

A negative lens having a maximum Abbe number among the negative lenses included in the lens unit GLN is denoted by a negative lens LNmax, and an Abbe number thereof is denoted by $\nu$Nmax.

A distance between an object-side surface vertex of the negative lens LNhigh and the aperture portion SP is denoted by dNS.

A distance between the most-object-side lens surface vertex and the aperture portion SP is denoted by d1S.

In this case, the following conditions are satisfied.

$$0.60 < SUM(LN)/SUM(L) < 1.00 \tag{1}$$

$$0.70 < (SUM(LNlow)+SUM(LNhigh))/SUM(LN) \tag{2}$$

$$3.50 < \nu LNmax/\nu LNmin < 6.50 \tag{3}$$

$$0.30 < dNS/d1S \leq 1.00 \tag{4}$$

$$0.065 < SUM(\Delta\theta LN) < 0.250 \tag{5}$$

Accordingly, good optical performance can be obtained over the entire image plane while allowing chromatic aberration of magnification between g-line and F-line as well as chromatic aberration of magnification between C-line and F-line to be corrected well.

Next, technical meaning of each of the aforementioned conditions will be described.

The condition (1) relates to the ratio of the number of negative lenses to the number of lenses in the lens unit GLN having a negative refractive power which is disposed closer to the object side than the aperture portion SP. As described above, at least one positive lens is included in the entire lens unit having a negative refractive power to form an aberration cancelling relation in the lens unit. However, as the ratio of the number of positive lenses is increased, flexibility in a solution maintaining the aberration cancelling relation is increased. However, in proportion to the flexibility, the power of the negative lens is required to be strengthened. The phrase "power of the negative lens is strengthened" means that an additional amount of aberration occurs in proportion to the strengthening. In order to prevent this issue, the power balance and the aberration balance are appropriately maintained between the positive lens and the negative lens. Accordingly, the number of negative lenses in the entire lens unit having a negative refractive power has a certain ratio or more.

If the ratio of the number of negative lenses is smaller than the lower limit value of the condition (1), the ratio of the number of positive lenses is increased. For this reason, the power of the negative lens is required to be strengthened, so that the absolute value of the aberration amount is too increased. Accordingly, it is difficult to correct the aberration in the lens unit. Therefore, the correction of the aberration between lens units is performed. Accordingly, it is difficult to obtain the aberration amount for achieving the purpose as the entire lens, which is not desirable.

Otherwise, a plurality of positive lenses having weak power is used to prevent the power of the negative lens from being strengthened. In this case, the length of the entire lens is increased, which is not useful.

On the other hand, if the value of the condition (1) becomes 1, all lenses in the lens unit having a negative refractive power become negative lenses. Accordingly, a relation of the correction of aberration in the lens unit cannot be produced, which is not useful.

More usefully, the condition (1) may be set as follows:

$$0.62 < SUM(LN)/SUM(L) < 1.00 \tag{1a}$$

The condition (2) relates to the ratio of the negative lenses having a large relative partial dispersion difference $\Delta\theta gF$ in the positive direction among the negative lenses of the lens unit GLN having a negative refractive power. As described above, although an accurate value of the magnitude of the anomalous dispersion property required to correct chromatic aberration of magnification is different according to the type of the lens, a very large anomalous dispersion property is required so as to achieve the purpose.

Therefore, if the value is smaller than the lower limit value of the condition (2), the anomalous dispersion property of the entire lens unit having a negative refractive power becomes insufficient, so that it is difficult to achieve the purpose.

More usefully, the condition (2) may be set as follows:

$$0.75 < (SUM(LNlow)+SUM(LNhigh))/SUM(LN) \tag{2a}$$

The condition (3) relates to an Abbe number ratio of maximum and minimum Abbe numbers of a material of the negative lens in the lens unit GLN having a negative refractive power.

If the Abbe number ratio of a material of the negative lens is larger than the upper limit value of the condition (3), the power required for effectively performing chromatic aberration of magnification between g-line and F-line by using the negative lens at the low dispersion side becomes excessively strengthened. In addition, the power at the high dispersion side is too weakened. Accordingly, it is difficult to compatibly correct chromatic aberration and spherical aberration or the like other than chromatic aberration.

On the other hand, if the value is smaller than the lower limit value of the condition (3), the relative partial dispersion difference ΔθgF of the negative lens at any one of the low dispersion side and the high dispersion side of the negative lens is decreased. In this case, in order to effectively correct chromatic aberration of magnification between g-line and F-line, the power of the negative lens having a smaller relative partial dispersion difference ΔθgF is required to be strengthened, so that it is difficult to correct spherical aberration or the like other than chromatic aberration.

More usefully, the condition (3) may be set as follows:

$$3.75 < vLNmax/vLNmin < 6.50 \quad (3a)$$

In addition, more usefully, the condition (3a) may be set as follows.

$$4.00 < vLNmax/vLNmin < 6.50 \quad (3b)$$

The condition (4) relates to a disposing position of the negative lens having a minimum Abbe number in the lens unit GLN having a negative refractive power.

As described above, in order to effectively correct chromatic aberration of magnification between g-line and F-line, a negative lens having high dispersion and a large relative partial dispersion difference ΔθgF as a positive value in the lens unit having a negative refractive power may be disposed at a position so that an off-axis principal light beam passes through a marginal position of the lens.

Therefore, if the value is smaller than the lower limit value of the condition (4), the negative lens made of a material having high dispersion is disposed adjacent the aperture portion SP, and the off-axis principal light beam does not almost pass through the marginal position of the lens. If the lens is disposed at this position, in order to correct chromatic aberration of magnification between g-line and F-line, a strong power is provided by the negative lens made of a material having high dispersion, so that it is difficult to correct spherical aberration.

Since the upper limit value of the condition (4) denotes that the negative lens made of a material having high dispersion is disposed at the closest object side, there is no case where the upper limit value is exceeded.

In addition, in an example of a zoom lens as an optical system according to the present invention, dNS values used for the calculation in "Table 1" represent the numerical values at the wide-angle end to effectively correct chromatic aberration of magnification at the wide-angle end.

More usefully, the condition (4) may be set as follows:

$$0.35 < dNS/d1S \leq 1.00 \quad (4a)$$

The condition (5) relates to a value of a relative partial dispersion difference ΔθgF of a negative lens in the lens unit GLN having a negative refractive power.

If a total sum of the relative partial dispersion differences ΔθgF of the negative lens is larger than the upper limit value of the condition (5), chromatic aberration of magnification between g-line and F-line can be corrected by using a weaker power, but the total power of the lens unit having a negative refractive power is also weakened. Therefore, a larger number of lenses are required to obtain good optical performance, so that the size of the optical system itself is increased, which is not useful.

On the other hand, if the value is smaller than the lower limit value of the condition (5), a strong power of the negative lens is required to effectively correct chromatic aberration of magnification between g-line and F-line. In this case, it is difficult to correct coma or curvature of field.

More usefully, the condition (5) may be set as follows:

$$0.075 < SUM(\Delta\theta LN) < 0.250 \quad (5a)$$

More usefully, the condition (5a) may be set as follows:

$$0.080 < SUM(\Delta\theta LN) < 0.200 \quad (5b)$$

In addition, more usefully, the condition (5b) may be set as follows:

$$0.090 < SUM(\Delta\theta LN) < 0.200 \quad (5c)$$

According to this configuration, an optical system according to an exemplary embodiment is achieved, and more usefully, at least one of the below-described conditions may be satisfied. Accordingly, it is possible to obtain higher optical performance.

It is useful that at least one positive lens LP as well as the negative lenses be included in the lens unit having a negative refractive power. Since the positive lenses are included, aberration in the lens unit having a negative refractive power can be corrected by using a combination of the positive lenses and the negative lenses. The correction of aberration referred to herein includes the correction of other basic aberrations such as spherical aberration or coma as well as the aforementioned correction of chromatic aberration of magnification. In the lens configuration in the lens unit having a negative refractive power, the negative lenses are dominantly configured in terms of the power relation. However, if the lens configuration in the lens unit having a negative refractive power is formed by using only the negative lenses, the function of cancelling the aberration occurring due to the negative lenses is completely performed by other lens units. Although aberration on the image plane may be finally reduced by the canceling function between the lens units, it is useful that the correction of aberration in the lens unit is performed if possible, in order to obtain an image having a higher quality.

Therefore, in order to correct aberration in the lens unit, it is useful that at least one positive lens LP as well as the negative lens be included in the lens unit having a negative refractive power, An Abbe number of a material of the positive lens LP is denoted by vLP.

A relative partial dispersion difference of a material of the negative lens LNmin is denoted by ΔθLNmin, and the power of the negative lens LNmin is denoted by φLNmin.

A relative partial dispersion difference of a material of the negative lens LNmax is denoted by ΔθLNmax, and the power of the negative lens LNmax is denoted by φLNmax.

A sum of relative partial dispersion differences of materials of the positive lenses LP is denoted by SUM(ΔθLP) (however, when there is one positive lens LP, a relative partial dispersion difference of a material of the positive lens LP).

A relative partial dispersion difference of a material of the negative lens LNmin is denoted by ΔθLNmin. A relative partial dispersion difference of a material of the negative lens LNmax is denoted by ΔθLNmax. When there is a plurality of negative lenses LNmin, a sum of the powers thereof is denoted by SUM(φLNmin), and when there is one negative lens LNmin, the power thereof is denoted by SUM (φLNmin). When there is a plurality of negative lenses LNmax, a sum of the powers thereof is denoted by SUM(φLNmax), and when there is one negative lens LNmax, the power thereof is denoted by SUM(φLNmax). In this case, it is useful that at least one of the following conditions be satisfied:

$$vLNmin < vLP < vLNmax \quad (6)$$

$$-5.0 \times 10^{-3} < \Delta\theta LNmin \times (\varphi LNmin/(vLNmin \times \varphi)) < -5.0 \times 10^{-5} \quad (7)$$

-continued $$-5.0 \times 10^{-4} < \Delta\theta LNmax \times (\varphi LNmax/(\nu LNmax \times \varphi)) < -5.0 \times 10^{-5} \quad (8)$$

$$-0.050 < \text{SUM}(\Delta\theta LP) < 0.040 \quad (9)$$

$$-1.00 \times 10^{-2} < \quad (10)$$
$$\left\{ \frac{\Delta\theta LNmax}{\nu LNmax} \times \text{SUM}(\varphi LNmax) + \frac{\Delta\theta LNmin}{\nu LNmin} \times \text{SUM}(\varphi LNmin) \right\} \times$$
$$\frac{\nu LNmax}{\nu LNmin} \times \frac{1}{\varphi} < -3.00 \times 10^{-4}$$

The condition (6) relates to an Abbe number of a material of the positive lens LP included in the lens unit GLN having a negative refractive power.

The positive lens LP has a function of correcting chromatic aberration of magnification between C-line and F-line in the lens unit according to the relation between the negative lens made of a material having low dispersion and the negative lens made of a material having high dispersion.

If the Abbe number of a material of the positive lens LP exceeds the upper or lower limit value of the condition (6), the material of the positive lens in the lens unit having a negative refractive power has too high dispersion or too low dispersion. Therefore, with respect to an obtainable glass material in the current state, it is difficult to combine the positive lens and the negative lens which correct chromatic aberration of magnification between g-line and F-line while correcting chromatic aberration of magnification between C-line and F-line in the lens unit having a negative refractive power, which is not useful.

The condition (7) relates to a correcting power for chromatic aberration of a material of the negative lens LNmin. If the value is larger than the upper limit value of the condition (7), the correcting power for chromatic aberration of the negative lens LNmin at the high dispersion side is weakened, chromatic aberration of magnification between g-line and F-line mainly remains.

On the other hand, if the value is smaller than the lower limit value of the condition (7), the correcting power for chromatic aberration of the negative lens LNmin at the high dispersion side is too strengthened. Therefore, chromatic aberration of magnification between g-line and F-line is over-corrected, and chromatic aberration of magnification between C-line and F-line is insufficiently corrected, which is not useful.

More usefully, the condition (7) may be set as follows:

$$-2.5 \times 10^{-3} < \Delta\theta LNmin \times (\varphi LNmin/(\nu LNmin \times \varphi)) < -5.5 \times 10^{-5} \quad (7a)$$

The condition (8) relates to a correcting power for chromatic aberration of the negative lens LNmax. If the value is larger than the upper limit value of the condition (8), the correcting power for chromatic aberration of the negative lens LNmax at the low dispersion side is weakened, so that chromatic aberration of magnification between C-line and F-line mainly remains.

On the other hand, if the value is smaller than the lower limit value of the condition (8), the correcting power for chromatic aberration of the negative lens LNmax at the low dispersion side is too strengthened, so that chromatic aberration of magnification between C-line and F-line is over-corrected, which is not useful.

More usefully, the condition (8) may be set as follows:

$$-3.0 \times 10^{-4} < \Delta\theta LNmax \times (\varphi LNmax/(\nu LNmax \times \varphi)) < -6.5 \times 10^{-5} \quad (8a)$$

The condition (9) relates to a sum of relative partial dispersion differences of materials of the positive lenses LP in the lens unit GLN having a negative refractive power. In the case of one positive lens LP, the condition (9) is a relative partial dispersion difference of a material of one positive lens LP.

If the value is larger than the upper limit value of the condition (9), the value of the relative partial dispersion θgF of the positive lens LP is increased. Therefore, chromatic aberration of magnification between g-line and F-line which is corrected by the negative lens LNlow or the negative lens LNhigh is corrected to the reverse side. As a result, chromatic aberration of magnification is insufficiently corrected, which is not useful.

On the other hand, if the value is smaller than the lower limit value of the condition (9), chromatic aberration of magnification between g-line and F-line is over-corrected, which is not useful.

More usefully, the condition (9) may be set as follows:

$$-0.040 < \text{SUM}(\Delta\theta LP) < 0.030 \quad (9a)$$

The condition (10) relates to a balance between the correcting power for chromatic aberration of the negative lens in the lens unit GLN having a negative refractive power and the correction of chromatic aberration of magnification based on the Abbe number ratio thereof.

If the value is larger than the upper limit value of the condition (10), the power of the negative lens is too strengthened, or the value of the relative partial dispersion θgF of a material of the negative lens is too increased. Therefore, it is difficult to perform the correction of chromatic aberration and the correction of curvature of field or coma with a good balance therebetween.

On the other hand, if the value is smaller than the lower limit value of the condition (10), the correcting power for chromatic aberration of the negative lens is weakened, and chromatic aberration of magnification between g-line and F-line mainly remains, which is not useful.

More usefully, the condition (10) may be set as follows:

$$-6.00 \times 10^{-3} < \quad (10a)$$
$$\left\{ \frac{\Delta\theta LNmax}{\nu LNmax} \times \text{SUM}(\varphi LNmax) + \frac{\Delta\theta LNmin}{\nu LNmin} \times \text{SUM}(\varphi LNmin) \right\} \times$$
$$\frac{\nu LNmax}{\nu LNmin} \times \frac{1}{\varphi} < -5.00 \times 10^{-4}$$

In addition, it is useful that the positive lens LP be included together with the negative lens LNlow or the negative lens LNhigh in the same lens unit. As described above, the positive lens LP corrects chromatic aberration by maintaining the balance of Abbe number between a material of the negative lens LNlow and a material of the negative lens LNhigh. Therefore, if the positive lens LP is separated too much in the optical direction in the positional relation from the negative lens LNlow or the negative lens LNhigh, it is difficult to maintain a balance between chromatic aberration and basic aberration, which is not useful.

According to the exemplary embodiments described above, chromatic aberration of magnification is corrected over the entire image plane, so that it is possible to obtain an optical system having high optical performance.

Next, configurations of the optical systems according to the exemplary embodiments will be described. The optical system L0 according to the first exemplary embodiment of FIG. 1 is a monofocal lens including a first lens unit L1 having a negative refractive power and a second lens unit L2 having a positive refractive power for focusing. Focusing from an infinite distance object to a finite distance object is performed by moving the second lens unit L2 toward the object side. The first lens unit L1 corresponds to the lens unit GLN.

The aperture stop SP is mounted in the second lens unit L2. During focusing, the aperture stop SP is moved together with the second lens unit L2. The aperture portion which determines the maximum axial light flux diameter is coincident with the aperture stop SP. The image-side surface of the third negative lens counted from the most-object-side negative lens of the first lens unit L1 and the object-side surface of the closest-image-side lens of the second lens unit L2 are aspheric.

Figure 3:
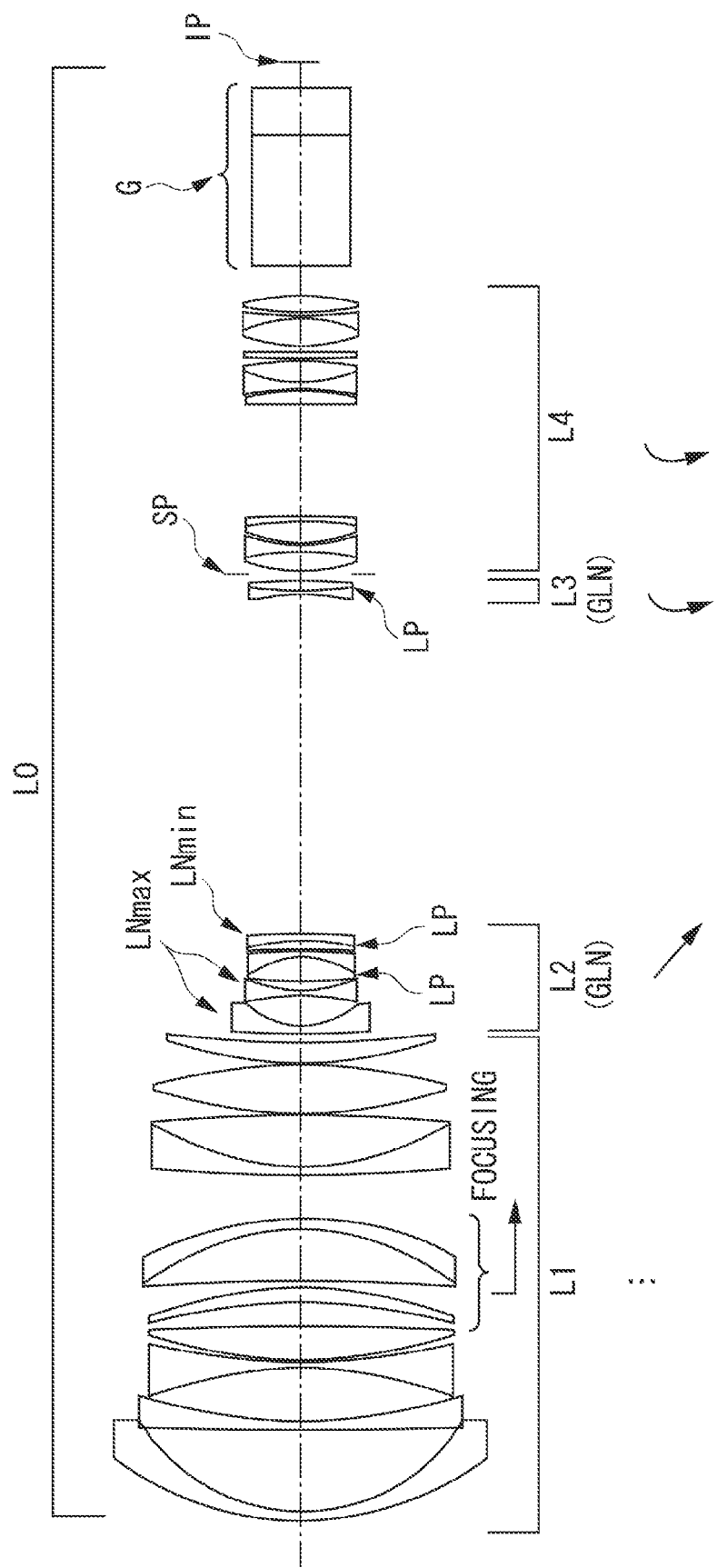
FIG. 3 is a lens cross-sectional view of an optical system at a wide-angle end according to a second exemplary embodiment of the present invention.

The optical system L0 according to the second exemplary embodiment of FIG. 3 includes a first lens unit L1 having a positive refractive power, a second lens unit L2 having a negative refractive power, and a third lens unit L3 having a negative refractive power. The optical system L0 further includes a fourth lens unit L4 having a positive refractive power at the image side of the third lens unit L3, thus serving as a four-unit zoom lens. As indicated by the arrow, during zooming from the wide-angle end to the telephoto end, the second to fourth lens units L2 to L4 are independently moved.

More specifically, the second lens unit L2 is moved along the optical axis toward the image side, and the third lens unit L3 is moved along a locus where, after the lens unit is moved to the object side once, the lens unit returns to the image side. In addition, the fourth lens unit L4 is independently moved so that the distance from the third lens unit L3 to the fourth lens unit L4 is changed. The second lens unit L2 and the third lens unit L3 correspond to the lens unit GLN. The aperture stop SP is mounted between the third lens unit L3 and the fourth lens unit L4. During focusing, the aperture SP is moved together with the fourth lens unit L4. The aperture portion is coincident with the aperture stop SP.

The object-side surface of the most-object-side negative lens of the second lens unit L2, the object-side surface of the second negative lens, the object-side surface of the second positive lens, and the object-side surface of the most-object-side lens of the fourth lens unit L4 are aspheric. In addition, focusing from an infinite distance object to a finite distance object is performed by moving some lens units (fifth to seventh lenses from the closest object side) of the first lens unit L1 toward the image side.

Figure 5:
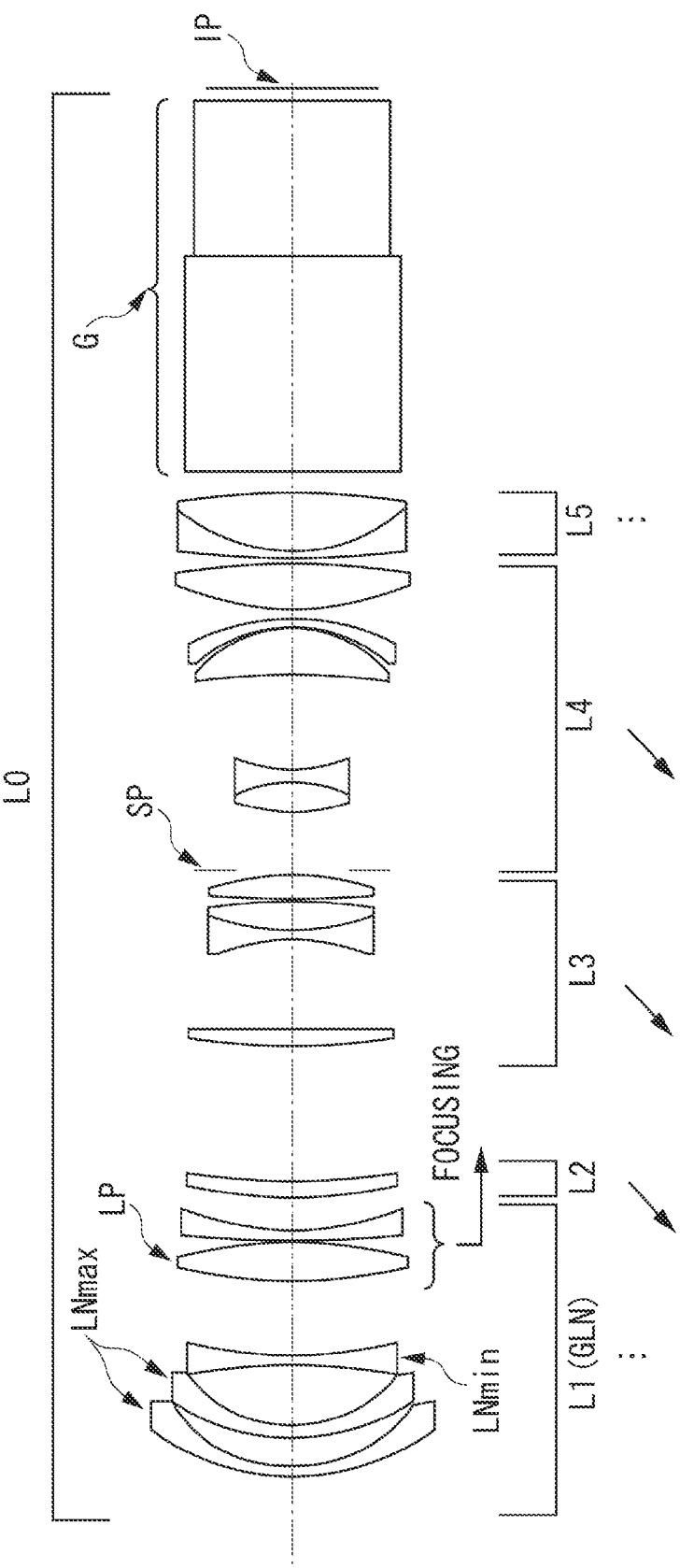
FIG. 5 is a lens cross-sectional view of an optical system at a wide-angle end according to a third exemplary embodiment of the present invention.

The optical system L0 according to the third exemplary embodiment of FIG. 5 includes a first lens unit L1 having a negative refractive power, a second lens unit L2 having a positive refractive power, and a third lens unit L3 having a positive refractive power. The optical system L0 further includes a fourth lens unit L4 having a positive refractive power and a fifth lens unit L5 having a positive refractive power at the image side of the third lens unit L3, serving as a five-unit zoom lens. As indicated by the arrow, during zooming from the wide-angle end to the telephoto end, the second to fourth lens units L2 to L4 are independently moved. More specifically, all the second to fourth lens units L2 to L4 are moved along the optical axis toward the object side, so that the distances between the lens units are changed. The first lens unit L1 corresponds to the negative lens GLN.

The aperture stop SP is disposed between the third lens unit L3 and the fourth lens unit L4. During zooming, the aperture stop SP is integrally moved together with the fourth lens unit L4. The aperture portion is coincident with the aperture stop SP.

The object-side surface of the second negative lens counted from the most-object-side negative lens of the first lens unit L1 and the image-side surface of the most-image-side lens of the third lens unit L3 are aspheric. In addition, focusing from an infinite distance object to a finite distance object is performed by moving lenses (fourth lens and fifth lens from the closest object side) in the first lens unit toward the image side.

Figure 7:
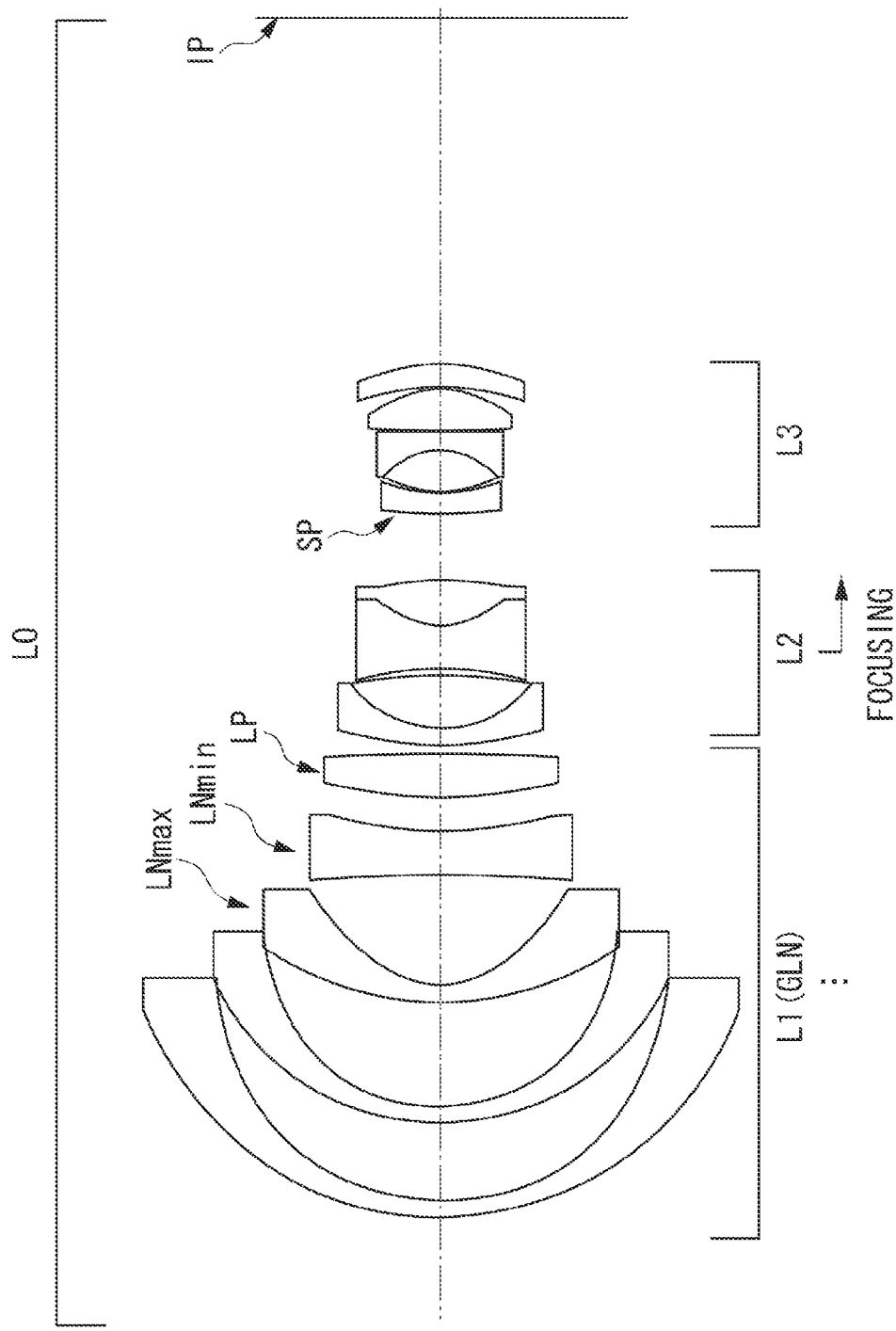
FIG. 7 is a lens cross-sectional view of an optical system according to a fourth exemplary embodiment of the present invention.

The optical system L0 according to the fourth exemplary embodiment of FIG. 7 is a monofocal lens including a first lens unit L1 having a negative refractive power, a second lens unit L2 having a positive refractive power for focusing, and a third lens unit L3 having a positive refractive power. Focusing from an infinite distance object to a finite distance object is performed by moving the second lens unit L2 to the image side. The first lens unit L1 corresponds to the negative lens GLN.

In the fourth exemplary embodiment, the aperture portion determining the maximum axial light flux diameter is an effective portion of the object-side surface of the most-object-side lens of the third lens unit L3. The aperture portion indicates that surface.

The image-side surface of the third negative lens counted from the most-object-side negative lens of the first lens unit L1 and the object-side surface of the most-image-side lens of the third lens unit L3 are aspheric.

Hereinafter, Numerical Examples 1 to 4 corresponding to the first to fourth exemplary embodiments will be described. In each numerical example, an ordinal number of a surface from the object side is denoted by i. A radius of curvature of the i-th surface from the object side is denoted by $r_i$. A distance between the i-th surface and the (i+1)-th surface from the object side is denoted by $d_i$. A refractive index and an Abbe number of an i-th optical member are denoted by $nd_i$ and $vd_i$, respectively. Relative partial dispersion is denoted by $\theta gF$, and a relative partial dispersion difference is denoted by $\Delta\theta gF$. When focusing is performed on an infinite distance object, a focal length of the entire optical system, an F-number, and an angle of view (degrees) are denoted by f, Fno, and 2ω, respectively.

When the direction of the optical axis is set to the X axis, the direction perpendicular to the optical axis is set to the H axis, the propagation direction of the light is set to be positive, a paraxial radius of curvature is denoted by R, a conic constant is denoted by k, and aspheric coefficients are denoted by A4, A6, A8, and A10, respectively, the aspheric shape can be expressed by the following equation:

$$X = \frac{\left(\frac{H^2}{R}\right)}{\left\{1 + \sqrt{1 - (1+K) \cdot \left(\frac{H}{R}\right)^2}\right\}} + A4 \cdot H^4 + A6 \cdot H^6 + A8 \cdot H^8 + A10 \cdot H^{10}$$

In addition, for example, the expression "e-Z" denotes "$\times 10^{-Z}$".

Relation between the aforementioned conditions and the numerical values in Numerical Examples is listed in Table 1.

Numerical Example 1

| | f = 1.00 mm Fno = 2.90 2ω = 113.44 | | | | | | |
|---|---|---|---|---|---|---|---|
| Surface number | r | d | nd | vd | Effective diameter | θgF | ΔθgF |
| 1 | 2.480 | 0.14 | 1.59282 | 68.6 | 4.66 | 0.54461 | 0.01428 LNlow |
| 2 | 1.865 | 0.58 | | | 3.72 | | |
| 3 | 2.041 | 0.14 | 1.497 | 81.5 | 3.70 | 0.53859 | 0.02916 LNlow |
| 4 | 1.436 | 0.92 | | | 2.87 | | |
| 5 | 2.369 | 0.14 | 1.43875 | 94.9 | 2.84 | 0.53463 | 0.04681 LNlow |

-continued f = 1.00 mm Fno = 2.90 2ω = 113.44

| | | | | | | | |
|---|---|---|---|---|---|---|---|
| 6 (Aspheric surface) | 0.752 | 0.77 | | | 2.25 | | |
| 7 | 4.710 | 0.35 | 1.92286 | 18.9 | 2.19 | 0.64947 | 0.03858 LNhigh |
| 8 | 1.540 | 0.45 | | | 1.83 | | |
| 9 | 3.352 | 0.35 | 1.91082 | 35.3 | 1.82 | 0.58243 | −0.00201 LP |
| 10 | −7.811 | 0.28 | | | 1.76 | | |
| 11 | −84.07 | 0.14 | 1.80100 | 35.0 | 1.49 | | |
| 12 | 1.446 | 0.33 | 1.72047 | 34.7 | 1.35 | | |
| 13 | −2.619 | 0.07 | | | 1.32 | | |
| 14 | −2.765 | 0.35 | 1.61800 | 63.3 | 1.20 | | |
| 15 | 0.749 | 0.40 | 1.65412 | 39.7 | 1.01 | | |
| 16 | −2.906 | 0.51 | | | 1.01 | | |
| 17 (Stop) | ∞ | 0.04 | | | 0.94 | | |
| 18 | 6.257 | 0.17 | 1.83400 | 37.2 | 0.93 | | |
| 19 | 1.500 | 0.03 | | | 0.90 | | |
| 20 | 1.250 | 0.40 | 1.49700 | 81.5 | 0.92 | | |
| 21 | −0.682 | 0.14 | 1.83400 | 37.2 | 0.90 | | |
| 22 | −52.074 | 0.01 | | | 0.98 | | |
| 23 | 5.967 | 0.36 | 1.49700 | 81.5 | 1.00 | | |
| 24 | −0.921 | 0.01 | | | 1.04 | | |
| 25 (Aspheric surface) | −2.299 | 0.19 | 1.71736 | 29.5 | 1.00 | | |
| 26 | −1.883 | 2.82 | | | 1.11 | | |
| Image plane | ∞ | | | | | | |

Aspheric surface data

6th surface

K = −6.69359e−001    A4 = −2.60000e−002    A6 = −3.48578e−002
A8 = 6.37046e−003    A10 = −5.45424e−002

25th surface

K = 5.48470e+000    A4 = −1.89495e−002    A6 = 4.81412e−003
A8 = −9.22734e−003    A10 = −1.01663e−001

-continued f = 1.00 mm Fno = 2.90 2ω = 113.44

Various data
Zoom ratio 1.00

| | |
|---|---|
| Focal length | 1.00 |
| F-number | 2.90 |
| Angle of view | 56.72 |
| Image height | 1.52 |
| Total lens length | 10.11 |
| BF | 2.82 |
| Position of entrance pupil | 2.46 |
| Position of exit pupil | −1.51 |
| Front principal point position | 3.23 |
| Rear principal point position | 1.82 |

Data of lens unit

| Unit | Leading surface | Focal length | Lens structure length | Front principal point position | Rear principal point position |
|---|---|---|---|---|---|
| 1 | 1 | −2.39 | 3.85 | 0.83 | −3.42 |
| 2 | 11 | 2.41 | 3.16 | 2.06 | −0.60 |

Data of single lens

| Lens | Leading surface | Focal length |
|---|---|---|
| 1 | 1 | −13.85 |
| 2 | 3 | −10.57 |
| 3 | 5 | −2.58 |
| 4 | 7 | −2.62 |
| 5 | 9 | 2.61 |
| 6 | 11 | −1.77 |
| 7 | 12 | 1.34 |
| 8 | 14 | −0.92 |
| 9 | 15 | 0.95 |
| 10 | 18 | −2.40 |
| 11 | 20 | 0.95 |
| 12 | 21 | −0.83 |
| 13 | 23 | 1.63 |
| 14 | 25 | 12.18 |

Numerical Example 2 f = 1.00 to 11.48 mm Fno = 1.84 to 2.05 2ω = 75.9 to 7.76

| Surface number | r | d | nd | νd | Effective diameter | θgF | ΔθgF |
|---|---|---|---|---|---|---|---|
| 1 | 11.177 | 0.37 | 1.73400 | 51.5 | 13.32 | 0.54839 | −0.00980 |
| 2 | 7.192 | 3.11 | | | 11.59 | | |
| 3 | 204.281 | 0.32 | 1.69680 | 55.5 | 11.34 | 0.54343 | −0.00821 |
| 4 | 18.784 | 1.98 | | | 10.76 | | |
| 5 | −15.507 | 0.31 | 1.65160 | 58.5 | 10.62 | 0.54178 | −0.00497 |
| 6 | 25.511 | 0.02 | | | 10.59 | | |
| 7 | 17.953 | 1.24 | 1.80518 | 25.4 | 10.66 | 0.61655 | 0.01623 |
| 8 | −113.389 | 0.94 | | | 10.62 | | |
| 9 | −20.727 | 0.54 | 1.49700 | 81.5 | 10.50 | 0.53859 | 0.02916 |
| 10 | −15.889 | 0.19 | | | 10.48 | | |
| 11 | −76.473 | 2.06 | 1.49700 | 81.5 | 10.10 | 0.53859 | 0.02916 |
| 12 | −8.971 | 0.35 | 1.73800 | 32.3 | 9.92 | 0.59029 | 0.00104 |
| 13 | −13.382 | 1.61 | | | 10.04 | | |
| 14 | 61.275 | 0.37 | 1.72342 | 38.0 | 9.97 | 0.58342 | 0.00336 |
| 15 | 10.539 | 1.94 | 1.49700 | 81.5 | 9.86 | 0.53859 | 0.02916 |
| 16 | −54.892 | 0.02 | | | 9.89 | | |
| 17 | 16.340 | 1.91 | 1.43387 | 95.1 | 10.17 | 0.53728 | 0.04975 |
| 18 | −18.618 | 0.02 | | | 10.17 | | |
| 19 | 14.086 | 0.75 | 1.59282 | 68.6 | 9.75 | 0.54461 | 0.01428 |
| 20 | 37.477 | (Variable) | | | 9.66 | | |

-continued

| f = 1.00 to 11.48 mm Fno = 1.84 to 2.05 2ω = 75.9 to 7.76 | | | | | | | |
|---|---|---|---|---|---|---|---|
| 21 (Aspheric surface) | −22.295 | 0.29 | 1.43875 | 94.9 | 4.56 | 0.53463 | 0.04681 |
| | | | | | | | LNlow |
| 22 | 3.022 | 1.07 | | | 3.69 | | |
| 23 (Aspheric surface) | 3995.497 | 0.19 | 1.43875 | 94.9 | 3.48 | 0.53463 | 0.04681 |
| | | | | | | | LNlow |
| 24 | 3.931 | 0.43 | | | 3.31 | | |
| 25 | 13.951 | 0.86 | 1.6398 | 34.5 | 3.32 | 0.59213 | 0.00644 |
| | | | | | | | LP |
| 26 | −3.451 | 0.19 | 1.59282 | 68.6 | 3.30 | 0.54461 | 0.01428 |
| | | | | | | | LNlow |
| 27 | −28.532 | 0.08 | | | 3.25 | | |
| 28 (Aspheric surface) | −9.967 | 0.37 | 1.48749 | 70.2 | 3.24 | 0.53026 | 0.00244 |
| | | | | | | | LP |
| 29 | −8.111 | 0.24 | 1.80809 | 22.8 | 3.19 | 0.63070 | 0.02607 |
| | | | | | | | LNhigh |
| 30 | 18.461 | (Variable) | | | 3.18 | | |
| 31 | −8.436 | 0.17 | 1.77250 | 49.6 | 3.49 | 0.55234 | −0.00885 |
| 32 | 40.422 | 0.28 | 1.84666 | 23.9 | 3.60 | 0.62172 | 0.01890 |
| | | | | | | | LP |
| 33 | 34.593 | (Variable) | | | 3.65 | | |
| 34 (Stop) | ∞ | 0.15 | | | 3.79 | | |
| 35 (Aspheric surface) | 7.235 | 0.70 | 1.67003 | 47.2 | 3.96 | | |
| 36 | −8.150 | 0.19 | 1.497 | 81.5 | 3.97 | | |
| 37 | 4.469 | 0.10 | | | 3.94 | | |
| 38 | 4.565 | 0.85 | 1.48749 | 70.2 | 3.99 | | |
| 39 | −11.928 | 0.18 | 1.90200 | 25.1 | 3.99 | | |
| 40 | −25.432 | 4.27 | | | 4.00 | | |
| 41 | 84.223 | 0.55 | 1.80809 | 22.8 | 3.98 | | |
| 42 | −6.705 | 0.02 | | | 4.00 | | |
| 43 | −8.889 | 0.19 | 1.90200 | 25.1 | 3.96 | | |
| 44 | 4.814 | 0.87 | 1.49700 | 81.5 | 3.98 | | |
| 45 | −16.281 | 0.02 | | | 4.07 | | |
| 46 | 19.030 | 0.29 | 1.80809 | 22.8 | 4.15 | | |
| 47 | −65.680 | 0.17 | | | 4.16 | | |
| 48 | 6.568 | 1.07 | 1.49700 | 81.5 | 4.20 | | |
| 49 | −5.253 | 0.18 | 1.90200 | 25.1 | 4.15 | | |
| 50 | 17.112 | 0.02 | | | 4.19 | | |
| 51 | 10.778 | 0.65 | 1.80809 | 22.8 | 4.22 | | |
| 52 | −9.011 | (Variable) | | | 4.22 | | |
| 53 | ∞ | 4.87 | 1.69680 | 55.5 | 3.64 | | |
| 54 | ∞ | 1.85 | 1.51633 | 64.1 | 2.46 | | |
| 55 | ∞ | 0.96 | | | 1.96 | | |
| Image plane | ∞ | | | | | | |

| Aspheric surface data |
|---|
| 21st surface |

| K = −1.07833e+002 | A4 = 3.89165e−003 | A6 = −7.96461e−005 |
|---|---|---|
| A8 = −1.70228e−005 | A10 = 3.25679e−006 | A12 = −1.30597e−007 |

23rd surface

| K = −1.16441e+012 | A4 = −1.34932e−002 | A6 = −1.17875e−003 |
|---|---|---|
| A8 = 1.20580e−004 | A10 = 3.80923e−006 | |

28th surface

| K = −1.37233e+001 | A4 = 7.05637e−003 | A6 = 6.58471e−004 |
|---|---|---|
| A8 = −2.84426e−005 | A10 = −1.08753e−005 | A12 = 1.02944e−006 |

35th surface

| K = −9.25857e+000 | A4 = 2.01826e−003 | A6 = −1.81310e−004 |
|---|---|---|
| A8 = 5.41586e−006 | A10 = 1.07780e−006 | A12 = −1.27891e−007 |

-continued

| f = 1.00 to 11.48 mm Fno = 1.84 to 2.05 2ω = 75.9 to 7.76 |||||  |
| --- | --- | --- | --- | --- | --- |
| Various data Zoom ratio 11.48 |||||  |
| Focal length | 1.00 | 3.16 | 5.75 | 8.71 | 11.48 |
| F-number | 1.84 | 1.84 | 1.84 | 1.84 | 2.05 |
| Angle of view | 37.95 | 13.86 | 7.73 | 5.12 | 3.88 |
| Image height | 0.78 | 0.78 | 0.78 | 0.78 | 0.78 |
| Total lens length | 55.02 | 55.02 | 55.02 | 55.02 | 55.02 |
| BF | 0.96 | 0.96 | 0.96 | 0.96 | 0.96 |
| d20 | 0.38 | 8.21 | 10.66 | 11.92 | 12.57 |
| d30 | 12.80 | 3.07 | 0.55 | 0.19 | 0.68 |
| d33 | 0.31 | 2.15 | 2.20 | 1.32 | 0.20 |
| d52 | 1.13 | 1.19 | 1.20 | 1.19 | 1.18 |
| Position of entrance pupil | 10.10 | 18.52 | 25.60 | 32.00 | 36.70 |
| Position of exit pupil | 89.75 | 89.69 | 89.68 | 89.69 | 89.70 |
| Front principal point position | 11.11 | 21.80 | 31.71 | 41.56 | 49.67 |
| Rear principal point position | −0.04 | −2.20 | −4.79 | −7.75 | −10.53 |

| Data of zoom lens unit |||||  |
| --- | --- | --- | --- | --- | --- |
| Unit | Leading surface | Focal length | Lens structure length | Front principal point position | Rear principal point position |
| 1 | 1 | 10.63 | 18.04 | 12.74 | 7.56 |
| 2 | 21 | −3.96 | 3.74 | 0.49 | −2.41 |
| 3 | 31 | −15.46 | 0.45 | −0.10 | −0.34 |
| 4 | 34 | 7.32 | 10.48 | 7.89 | −6.51 |
| G | 53 | ∞ | 6.73 | 2.05 | −2.05 |

| Data of single lens |||
| --- | --- | --- |
| Lens | Leading surface | Focal length |
| 1 | 1 | −28.61 |
| 2 | 3 | −29.71 |
| 3 | 5 | −14.76 |
| 4 | 7 | 19.33 |
| 5 | 9 | 132.06 |
| 6 | 11 | 20.25 |
| 7 | 12 | −38.17 |
| 8 | 14 | −17.65 |
| 9 | 15 | 17.97 |
| 10 | 17 | 20.39 |
| 11 | 19 | 37.62 |
| 12 | 21 | −6.05 |
| 13 | 23 | −8.97 |
| 14 | 25 | 4.41 |
| 15 | 26 | −6.64 |
| 16 | 28 | 83.83 |
| 17 | 29 | −18.09 |
| 18 | 31 | −9.02 |
| 19 | 32 | 22.05 |
| 20 | 35 | 5.83 |
| 21 | 36 | −5.78 |
| 22 | 38 | 6.89 |
| 23 | 39 | −25.06 |
| 24 | 41 | 7.71 |
| 25 | 43 | −3.44 |
| 26 | 44 | 7.58 |
| 27 | 46 | 18.29 |
| 28 | 48 | 6.06 |
| 29 | 49 | −4.44 |
| 30 | 51 | 6.16 |
| G | 53 | 0.00 |
| G | 54 | 0.00 |

Numerical Example 3 f = 1.00 to 1.35 mm Fno = 3.06 to 3.10 2ω = 71.96 to 56.68°

| Surface number | r | d | nd | νd | Effective diameter | θgF | ΔθgF |
|---|---|---|---|---|---|---|---|
| 1 | 1.929 | 0.07 | 1.49700 | 81.5 | 2.21 | 0.53859 | 0.02916 LNlow |
| 2 | 1.198 | 0.25 | | | 1.92 | | |
| 3 (Aspheric surface) | 2.131 | 0.10 | 1.49700 | 81.5 | 1.88 | 0.53859 | 0.02916 LNlow |
| 4 | 1.081 | 0.51 | | | 1.64 | | |
| 5 | −4.132 | 0.07 | 1.92286 | 18.9 | 1.60 | 0.64947 | 0.03858 LNhigh |
| 6 | 2.947 | 0.63 | | | 1.57 | | |
| 7 | 3.707 | 0.33 | 1.80100 | 35.0 | 1.82 | 0.58621 | 0.00131 LP |
| 8 | −3.757 | 0.01 | | | 1.81 | | |
| 9 | 10.689 | 0.07 | 1.56907 | 71.3 | 1.74 | 0.54511 | 0.01902 LNlow |
| 10 | 2.058 | (Variable) | | | 1.68 | | |
| 11 | 3.079 | 0.15 | 1.84666 | 23.9 | 1.68 | | |
| 12 | 6.118 | (Variable) | | | 1.66 | | |
| 13 | 4.171 | 0.15 | 1.84666 | 23.9 | 1.64 | | |
| 14 | 42.539 | 0.75 | | | 1.62 | | |
| 15 | −1.755 | 0.07 | 1.73800 | 32.3 | 1.29 | | |
| 16 | 2.184 | 0.25 | 1.48749 | 70.2 | 1.30 | | |
| 17 | −3.408 | 0.01 | | | 1.32 | | |
| 18 | 8.468 | 0.21 | 1.67790 | 54.9 | 1.32 | | |
| 19 (Aspheric surface) | −1.910 | (Variable) | | | 1.32 | | |
| 20 (Stop) | ∞ | 0.49 | | | 0.92 | | |
| 21 | 1.849 | 0.24 | 1.75520 | 27.5 | 0.88 | | |
| 22 | −1.129 | 0.10 | 1.83400 | 37.2 | 0.89 | | |
| 23 | 1.226 | 0.80 | | | 0.90 | | |
| 24 | −5.445 | 0.38 | 1.49700 | 81.5 | 1.50 | | |
| 25 | −1.046 | 0.01 | | | 1.56 | | |
| 26 | −1.222 | 0.07 | 1.80440 | 39.6 | 1.56 | | |
| 27 | −1.891 | 0.07 | | | 1.67 | | |
| 28 | 2.319 | 0.38 | 1.49700 | 81.5 | 1.90 | | |
| 29 | −6.164 | (Variable) | | | 1.90 | | |
| 30 | 6.269 | 0.07 | 1.85026 | 32.3 | 1.86 | | |
| 31 | 1.435 | 0.48 | 1.56907 | 71.3 | 1.79 | | |
| 32 | −6.007 | 0.18 | | | 1.79 | | |
| 33 | ∞ | 1.80 | 1.51633 | 64.1 | 1.75 | | |
| 34 | ∞ | 0.00 | | | 1.58 | | |
| 35 | ∞ | 1.29 | 1.69680 | 55.5 | 1.58 | | |
| 36 | ∞ | 0.10 | | | 1.47 | | |
| Image plane | ∞ | | | | | | |

Aspheric surface data

3rd surface

K = 4.74760e−001    A4 = 4.57093e−002    A6 = 2.12410e−002
A8 = −1.28841e−002  A10 = 1.47164e−002

19th surface

K = −1.21961e−002   A4 = −2.34158e−003   A6 = 5.87571e−003
A8 = −1.98211e−002  A10 = 1.82450e−002

Various data
Zoom ratio 1.35

| | Wide-angle | Medium-angle | Telephoto |
|---|---|---|---|
| Focal length | 1.00 | 1.18 | 1.35 |
| F-number | 3.06 | 3.08 | 3.10 |
| Angle of view | 35.98 | 31.62 | 28.34 |
| Image height | 0.73 | 0.73 | 0.73 |
| Total lens length | 11.55 | 11.55 | 11.55 |
| BF | 0.10 | 0.10 | 0.10 |
| d10 | 0.28 | 0.12 | 0.12 |
| d12 | 1.11 | 0.60 | 0.04 |
| d19 | 0.04 | 0.61 | 1.11 |
| d29 | 0.04 | 0.13 | 0.19 |
| Position of entrance pupil | 1.58 | 1.61 | 1.65 |
| Position of exit pupil | −16.56 | −16.78 | −16.94 |
| Front principal point position | 2.52 | 2.70 | 2.89 |
| Rear principal point position | −0.90 | −1.07 | −1.24 |

Data of zoom lens unit

| Unit | Leading surface | Focal length | Lens structure length | Front principal point position | Rear principal point position |
|---|---|---|---|---|---|
| 1 | 1 | −1.53 | 2.03 | 0.35 | −1.55 |
| 2 | 11 | 7.16 | 0.15 | −0.08 | −0.16 |
| 3 | 13 | 3.96 | 1.44 | 1.02 | −0.37 |
| 4 | 20 | 3.37 | 2.55 | 2.50 | 0.79 |
| 5 | 30 | 27.25 | 3.82 | 0.69 | −1.77 |

Data of single lens

| Lens | Leading surface | Focal length |
|---|---|---|
| 1 | 1 | −6.57 |
| 2 | 3 | −4.56 |
| 3 | 5 | −1.85 |
| 4 | 7 | 2.38 |
| 5 | 9 | −4.49 |
| 6 | 11 | 7.16 |
| 7 | 13 | 5.45 |
| 8 | 15 | −1.31 |
| 9 | 16 | 2.77 |
| 10 | 18 | 2.32 |
| 11 | 21 | 0.96 |
| 12 | 22 | −0.69 |
| 13 | 24 | 2.53 |
| 14 | 26 | −4.51 |
| 15 | 28 | 3.44 |
| 16 | 30 | −2.20 |
| 17 | 31 | 2.08 |
| G | 33 | 0.00 |
| G | 35 | 0.00 |

Numerical Example 4 f = 1.00 mm Fno = 2.90 2ω = 113.44

| Surface number | r | d | nd | νd | Effective diameter | θgF | ΔθgF |
|---|---|---|---|---|---|---|---|
| 1 | 2.589 | 0.14 | 1.59282 | 68.6 | 4.67 | 0.54461 | 0.01428 LNlow |
| 2 | 1.836 | 0.63 | | | 3.65 | | |
| 3 | 2.053 | 0.14 | 1.49700 | 81.5 | 3.56 | 0.53859 | 0.02916 LNlow |
| 4 | 1.444 | 0.85 | | | 2.84 | | |
| 5 | 2.497 | 0.14 | 1.43875 | 94.9 | 2.76 | 0.53463 | 0.04681 LNlow |
| 6 (Aspheric surface) | 0.705 | 0.92 | | | 2.13 | | |
| 7 | −13.566 | 0.35 | 1.92286 | 18.9 | 2.05 | 0.64947 | 0.03858 LNhigh |
| 8 | 3.318 | 0.28 | | | 1.86 | | |

-continued f = 1.00 mm Fno = 2.90 2ω = 113.44

| 9 | 4.072 | 0.35 | 1.91082 | 35.3 | 1.81 | 0.58243 | −0.00201 LP |
|---|---|---|---|---|---|---|---|
| 10 | −19.119 | 0.07 | | | 1.74 | | |
| 11 | 2.580 | 0.14 | 1.80100 | 35.0 | 1.59 | | |
| 12 | 0.919 | 0.44 | 1.72047 | 34.7 | 1.37 | | |
| 13 | −3.910 | 0.05 | | | 1.33 | | |
| 14 | −2.255 | 0.35 | 1.61800 | 63.3 | 1.31 | | |
| 15 | 0.748 | 0.36 | 1.65412 | 39.7 | 0.98 | | |
| 16 | −3.186 | 0.55 | | | 0.98 | | |
| 17 (SP) | 3.859 | 0.17 | 1.83400 | 37.2 | 0.90 | | |
| 18 | 1.185 | 0.01 | | | 0.86 | | |
| 19 | 1.206 | 0.34 | 1.49700 | 81.5 | 0.87 | | |
| 20 | −0.617 | 0.14 | 1.83400 | 37.2 | 0.87 | | |
| 21 | −66.074 | 0.01 | | | 0.96 | | |
| 22 | 5.536 | 0.36 | 1.49700 | 81.5 | 1 | | |
| 23 | −0.885 | 0.01 | | | 1.13 | | |
| 24 (Aspheric surface) | −2.103 | 0.19 | 1.71736 | 29.5 | 1.21 | | |
| 25 | −1.534 | 2.84 | | | 1.31 | | |
| Image plane | ∞ | | | | | | |

Aspheric surface data

6th surface

K = −6.91642e−001  A4 = −4.64563e−002  A6 = −6.07658e−002
A8 = 7.97044e−003  A10 = −6.22218e−002

24th surface

K = 3.01727e+000  A4 = −2.55570e−002  A6 = 7.40902e−003
A8 = −1.58247e−003  A10 = −7.77952e−002

-continued f = 1.00 mm Fno = 2.90 2ω = 113.44

| Focal length | 1.00 |
|---|---|
| F-number | 2.90 |
| Angle of view | 56.72 |
| Image height | 1.52 |
| Total lens length | 9.85 |
| BF | 2.84 |
| Position of entrance pupil | 2.35 |
| Position of exit pupil | −1.38 |
| Front principal point position | 3.11 |
| Rear principal point position | 1.84 |

-continued f = 1.00 mm Fno = 2.90 2ω = 113.44

Data of lens unit

| Unit | Leading surface | Focal length | Lens structure length | Front principal point position | Rear principal point position |
|---|---|---|---|---|---|
| 1 | 1 | −1.36 | 3.81 | 1.32 | −2.09 |
| 2 | 11 | 2.79 | 1.34 | 0.42 | −0.49 |
| 3 | 17 | 3.17 | 1.24 | 1.23 | 0.64 |

Data of single lens

| Lens | Leading surface | Focal length |
|---|---|---|
| 1 | 1 | −11.45 |
| 2 | 3 | −10.61 |
| 3 | 5 | −2.29 |
| 4 | 7 | −2.86 |
| 5 | 9 | 3.71 |
| 6 | 11 | −1.85 |
| 7 | 12 | 1.07 |
| 8 | 14 | −0.87 |
| 9 | 15 | 0.96 |
| 10 | 17 | −2.11 |
| 11 | 19 | 0.88 |
| 12 | 20 | −0.75 |
| 13 | 22 | 1.56 |
| 14 | 24 | 6.93 |

TABLE 1

| | | Example 1 | Example 2 | Example 3 | Example 4 |
|---|---|---|---|---|---|
| Condition (1) | | 0.80 | 0.63 | 0.8 | 0.8 |
| Condition (2) | | 1.00 | 0.80 | 1.00 | 1.00 |
| Condition (3) | | 5.02 | 4.16 | 4.31 | 5.02 |
| Condition (4) | | 0.55 | 0.39 | 0.82 | 0.51 |
| Condition (5) | | 0.1288 | 0.1251 | 0.1159 | 0.1288 |
| Condition (6) | νLNmin | 18.9 | 22.8 | 18.9 | 18.9 |
| | νLP | 35.3 | 34.5 | 35.0 | 35.3 |
| | | — | 70.2 | — | — |
| | | — | 23.9 | — | — |
| | νLNmax | 94.9 | 94.9 | 81.5 | 94.9 |
| Condition (7) | | −7.79E−04 | −6.32E−05 | −1.10E−03 | −7.14E−04 |
| Condition (8) | | −1.91E−04 | −8.16E−05 | −5.45E−05 | −2.15E−04 |
| | | — | −5.50E−05 | −7.85E−05 | — |
| Condition (9) | | −0.0020 | 0.0278 | 0.0013 | −0.0020 |
| Condition (10) | | −4.87E−03 | −8.32E−04 | −5.32E−03 | −4.66E−03 |

Next, an example where each of the optical systems according to the first to fourth exemplary embodiments is applied to an optical apparatus such as a digital single lens reflex camera will be described with reference to FIG. 11.

Figure 11:
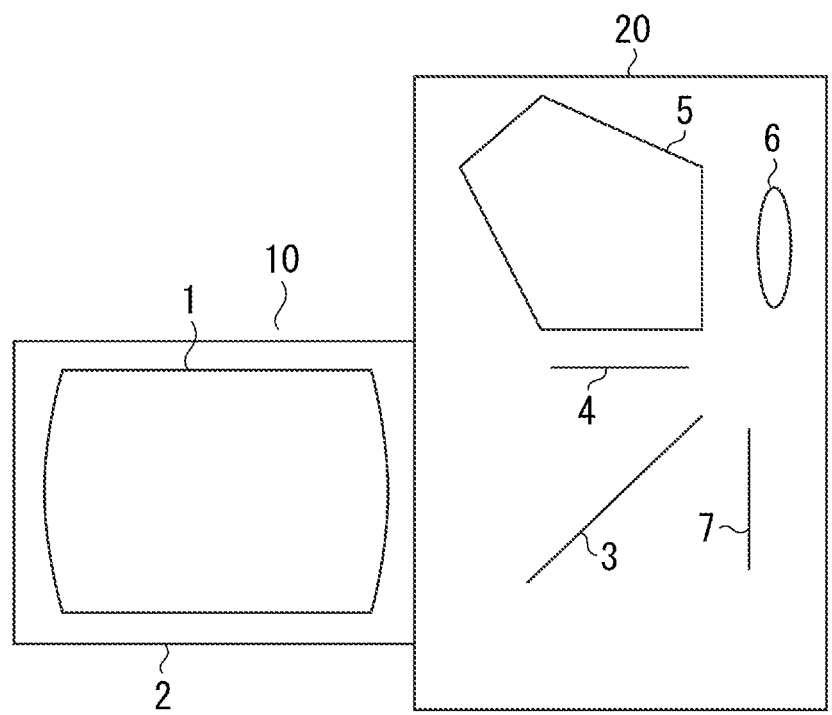
FIG. 11 is a schematic view illustrating main components of an optical apparatus according to an exemplary embodiment of the present invention.

FIG. 11 is a schematic view illustrating main components of a single lens reflex camera. In FIG. 11, reference numeral "10" represents a photographic lens including the optical system according to each of the first to fourth exemplary embodiments.

The optical system 1 is held by a lens barrel 2 as a holding member. Reference numeral "20" represents a camera body, which includes a quick return mirror 3 reflecting a light flux from the photographic lens 10 upwards and a focusing screen 4 disposed at an image forming position of the photographic lens 10. In addition, the camera body 20 further includes a pentagonal roof prism 5, which converts an inverted image formed on the focusing screen 4 into an erected image, an eyepiece lens 6, which forms a magnified erected image, and the like.

Reference numeral "7" represents a photosensitive surface where a solid-state image sensor (photoelectric conversion element) such as a CCD sensor or a CMOS sensor or a silver-halide film is disposed thereon. During photographing, the quick return mirror 3 is retracted from the optical path, and an image is formed on the photosensitive surface 7 by the photographic lens 10.

The optical system according to each exemplary embodiment can also be applied to a projector, a TV camera, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-082795 filed Apr. 4, 2011, which is hereby incorporated by reference herein in its entirety.

What is claimed is:

1. An optical system comprising a lens unit GLN including at least one lens unit having a negative refractive power which is disposed closer to an object side than an aperture portion SP, wherein, when a relative partial dispersion difference and an Abbe number of a material of a negative lens included in the lens unit GLN are denoted by $\Delta\theta LN$ and $\nu LN$, respectively, a negative lens satisfying the following conditions:

$$0.006 < \Delta\theta LN \text{ and}$$

$$60 < \nu LN$$

is denoted by a negative lens LNlow, the number of the negative lenses LNlow is denoted by SUM(LNlow), a negative lens satisfying the following conditions:

$$0.006 < \Delta\theta LN \text{ and}$$

$$\nu LN < 25$$

is denoted by a negative lens LNhigh, the number of the negative lenses LNhigh is denoted by SUM(LNhigh), the number of lenses included in the lens unit GLN is denoted by SUM(L), the number of negative lenses included in the lens unit GLN is denoted by SUM(LN), a sum of relative partial dispersion differences of materials of the negative lenses included in the lens unit GLN is denoted by SUM($\Delta\theta LN$), a negative lens having a minimum Abbe number among the negative lenses included in the lens unit GLN is denoted by a negative lens LNmin, an Abbe number thereof is denoted by $\nu LN\min$, a negative lens having a maximum Abbe number among the negative lenses included in the lens unit GLN is denoted by a negative lens LNmax, an Abbe number thereof is denoted by $\nu LN\max$, a distance between an object-side surface vertex of the negative lens LNhigh and the aperture portion SP is denoted by dNS, and a distance between the most-object-side lens surface vertex and the aperture portion SP is denoted by d1S, the following conditions are satisfied:

$$0.60 < \text{SUM}(LN)/\text{SUM}(L) < 1.00,$$

$$0.70 < (\text{SUM}(LN\text{low}) + \text{SUM}(LN\text{high}))/\text{SUM}(LN),$$

$$3.50 < \nu LN\max/\nu LN\min < 6.50,$$

$$0.30 < dNS/d1S \leq 1.00, \text{ and}$$

$$0.065 < \text{SUM}(\Delta\theta LN) < 0.250, \text{ and}$$

wherein, when the optical system is a zoom lens, the position of the aperture portion SP is a position defined when the zoom lens is at a wide-angle end.

2. The optical system according to claim 1,
wherein the lens unit GLN includes a positive lens LP, and
wherein, when an Abbe number of a material of the positive lens LP is denoted by $\nu LP$, the following condition is satisfied:

$$\nu LN\min < \nu LP < \nu LN\max.$$

3. The optical system according to claim 2, wherein, when a sum of relative partial dispersion differences of materials of the positive lenses LP is denoted by SUM($\Delta\theta LP$), the following condition is satisfied:

$$-0.050 < \text{SUM}(\Delta\theta LP) < 0.040, \text{ and}$$

wherein, when only one positive lens LP is included in the lens unit GLN, a relative partial dispersion difference of a material of the positive lens LP is denoted by SUM($\Delta\theta LP$).

4. The optical system according to claim 2, wherein the positive lens LP is included together with the negative lens LNlow or the negative lens LNhigh in the same lens unit.

5. The optical system according to claim 1,
wherein, when a relative partial dispersion difference of a material of the negative lens LNmin is denoted by $\Delta\theta LN\min$, a power of the negative lens LNmin is denoted by $\phi LN\min$, and a power of the optical system is denoted by $\phi$, the following condition is satisfied with respect to at least one negative lens LNmin:

$$-5.0\times10^{-3} < \Delta\theta LN\min \times (\phi LN\min/(\nu LN\min \times \phi)) < -5.0\times10^{-5},$$

and
wherein, when the optical system is the zoom lens, the power $\phi$ of the optical system is defined when the zoom lens is at the wide-angle end.

6. The optical system according to claim 1,
wherein, when a relative partial dispersion difference of a material of the negative lens LNmax is denoted by $\Delta\theta LN\max$, a power of the negative lens LNmax is denoted by $\phi LN\max$, and a power of the optical system is denoted by $\phi$, the following condition is satisfied with respect to at least one negative lens LNmax:

$$-5.0\times10^{-4} < \Delta\theta LN\max \times (\phi LN\max/(\nu LN\max \times \phi)) < -5.0\times10^{-5},$$

and
wherein, when the optical system is the zoom lens, the power $\phi$ of the optical system is defined when the zoom lens is at the wide-angle end.

7. The optical system according to claim 1, wherein, when a relative partial dispersion difference of a material of the negative lens LNmin is denoted by $\Delta\theta LN\min$, a relative partial dispersion difference of a material of the negative lens LNmax is denoted by $\Delta\theta LN\max$, a sum of powers of the negative lenses LNmin is denoted by SUM($\phi LN\min$), and a sum of powers of the negative lenses LNmax is denoted by SUM($\phi LN\max$), the following condition is satisfied:

$$-1.00 \times 10^{-2} < \left\{ \frac{\Delta\theta LNmax}{\nu LNmax} \times \text{SUM}(\varphi LNmax) + \frac{\Delta\theta LNmin}{\nu LNmin} \times \text{SUM}(\varphi LNmin) \right\} \times \frac{\nu LNmax}{\nu LNmin} \times \frac{1}{\varphi} < -3.00 \times 10^{-4},$$

and wherein, when only one negative lens LNmin is included in the lens unit GLN, the power of the negative lens LNmin is denoted by SUM(φLNmin), and when only one negative lens LNmax is included in the lens unit GLN, the power of the negative lens LNmax is denoted by SUM (φLNmax).

8. The optical system according to claim 1, wherein the optical system includes, in order from the object side to the image side, a first lens unit having a negative refractive power and a second lens unit having a positive refractive power which is moved during focusing.

9. The optical system according to claim 1, wherein the optical system includes, in order from the object side to the image side, a first lens unit having a positive refractive power, a second lens unit having a negative refractive power, a third lens unit having a negative refractive power, and a fourth lens unit having a positive refractive power, and wherein the second to fourth lens units are independently moved during zooming.

10. The optical system according to claim 1, wherein the optical system includes, in order from the object side to the image side, a first lens unit having a negative refractive power, a second lens unit having a positive refractive power, a third lens unit having a positive refractive power, a fourth lens unit having a positive refractive power, and a fifth lens unit having a positive refractive power, and wherein the second to fourth lens units are independently moved during zooming.

11. The optical system according to claim 1, wherein the optical system includes, in order from the object side to the image side, a first lens unit having a negative refractive power, a second lens unit having a positive refractive power which is moved during focusing, and a third lens unit having a positive refractive power.

12. An optical apparatus comprising the optical system according to claim 1.

* * * * *